US 7,428,590 B2

(12) United States Patent
Miller et al.

(10) Patent No.: US 7,428,590 B2
(45) Date of Patent: Sep. 23, 2008

(54) SYSTEMS AND METHODS FOR REFLECTING MESSAGES ASSOCIATED WITH A TARGET PROTOCOL WITHIN A NETWORK

(75) Inventors: Randy Miller, Lemon Grove, CA (US); Robert Poling, La Mesa, CA (US); Richard S. Pugh, Poway, CA (US); Dmitry Shapiro, San Diego, CA (US)

(73) Assignee: Akonix Systems, Inc., San Diego, CA (US)

( * ) Notice: Subject to any disclaimer, the term of this patent is extended or adjusted under 35 U.S.C. 154(b) by 865 days.

(21) Appl. No.: 10/459,725

(22) Filed: Jun. 10, 2003

(65) Prior Publication Data

US 2004/0136386 A1    Jul. 15, 2004

Related U.S. Application Data

(63) Continuation-in-part of application No. 10/167,228, filed on Jun. 10, 2002, now abandoned.

(60) Provisional application No. 60/445,648, filed on Feb. 7, 2003, provisional application No. 60/387,761, filed on Jun. 10, 2002.

(51) Int. Cl.
*G06F 13/00* (2006.01)
(52) U.S. Cl. .................. 709/225; 709/238; 709/250
(58) Field of Classification Search ............ 709/223, 709/225, 238, 245, 246, 250
See application file for complete search history.

(56) References Cited

U.S. PATENT DOCUMENTS

| 5,761,415 | A | * | 6/1998 | Joseph et al. ............... 709/200 |
| 5,968,176 | A | | 10/1999 | Nessett et al. |
| 6,081,900 | A | * | 6/2000 | Subramaniam et al. ....... 726/19 |
| 6,154,775 | A | | 11/2000 | Coss et al. |
| 6,226,372 | B1 | | 5/2001 | Beebe et al. |
| 6,317,837 | B1 | | 11/2001 | Kenworthy |
| 6,321,337 | B1 | | 11/2001 | Reshef et al. |
| 6,513,122 | B1 | | 1/2003 | Magdych et al. |
| 6,519,703 | B1 | | 2/2003 | Joyce |
| 6,557,037 | B1 | * | 4/2003 | Provino ................. 709/227 |
| 6,715,084 | B2 | | 3/2004 | Aaron et al. |
| 6,721,890 | B1 | | 4/2004 | Shrikhande |
| 7,076,650 | B1 | | 7/2006 | Sonnenberg |
| 7,143,439 | B2 | | 11/2006 | Cooper et al. |
| 2002/0069200 | A1 | | 6/2002 | Cooper et al. |
| 2002/0103931 | A1 | * | 8/2002 | Mott ..................... 709/245 |
| 2002/0116643 | A1 | | 8/2002 | Raanan et al. |
| 2002/0178231 | A1 | | 11/2002 | Matsa et al. |
| 2003/0018726 | A1 | | 1/2003 | Low et al. |
| 2003/0055982 | A1 | | 3/2003 | Noro et al. |

(Continued)

OTHER PUBLICATIONS

International Search Report for related PCT International Application No. PCT/US03/18311, filed Jun. 10, 2003.

*Primary Examiner*—Viet D. Vu
(74) *Attorney, Agent, or Firm*—Baker & McKenzie LLP

(57) ABSTRACT

A protocol management system is capable of detecting certain message protocols and applying policy rules to the detected message protocols that prevent intrusion, or abuse, of a network's resources. In one aspect, a protocol message gateway is configured to apply policy rules to high level message protocols, such as those that reside at layer 7 of the ISO protocol stack.

19 Claims, 16 Drawing Sheets

U.S. PATENT DOCUMENTS

| | | |
|---|---|---|
| 2003/0055994 A1 | 3/2003 | Herrmann et al. |
| 2003/0088787 A1* | 5/2003 | Egevang .................... 713/201 |
| 2003/0101343 A1 | 5/2003 | Eaton et al. |
| 2003/0145226 A1 | 7/2003 | Bruton, III et al. |
| 2003/0154399 A1 | 8/2003 | Zuk et al. |
| 2003/0204722 A1 | 10/2003 | Schoen et al. |

* cited by examiner

SYSTEMS AND METHODS FOR REFLECTING MESSAGES ASSOCIATED WITH A TARGET PROTOCOL WITHIN A NETWORK

RELATED APPLICATIONS INFORMATION

This application claims priority under 35 USC §119 to U.S. Provisional Application Ser. No. 60/387,761, entitled "PROXY ENFORCER FOR ROGUE PROTOCOL MESSAGES," filed on Jun. 10, 2002 and to U.S. U.S. Provisional Application Ser. No. 60/445,648, entitled "DETECTION AND REPORTING OF USER PRESENCE," filed on Feb. 7, 2003, which are both incorporated herein by reference as though set forth in full. This application also claims priority as a continuation-in-part under 35 U.S.C §120 to U.S. patent application Ser. No. 10/167,228, entitled "EXTENDIBLE GATEWAY FOR PROTECTION AGAINST ROGUE PROTOCOLS," filed on Jun. 10, 2002, now abandoned which is incorporated herein by reference as though set in full.

BACKGROUND

1. Field of the Inventions

The field of the invention relates generally to digital communications networks and more particularly to the management of a plurality of protocols over such networks including dynamic protocols such as "Instant Message" protocols.

2. Background Information

When a local computing device coupled to a local, or proprietary, network communicates with a remote computing device outside the network, the network can become subject to attempts at intrusion. Intrusion can, for example, be defined as someone trying to wrongfully access the network. Intrusion can also be defined as a program, such as a computer virus, attempting to wrongfully access resources available on the network. For example, a computer virus can be sent from a remote computing device to the local computing device, and if allowed to operate on the local computing device, can commandeer resources at the local computing device as well as other local resources, such as those available to the local computing device on the network or otherwise. For another example, a remote computing device can generate a set of messages in an attempt to deny service to, or otherwise have an effect on service at, the local computing device, such as preventing access by that local computing device to proper resources, or by preventing access by others to that local computing device.

In some cases, intrusion can be caused by messages directed at the network, while in other cases, intrusion can be caused by messages from inside the network, such as from a computing device within the network under the control of a computer virus or an employee using the network improperly. For example, a computing device within the network can be corrupted by a malicious user of that computing device, i.e., a user who is attempting to access local resources in a way that is not desired. A computing device can also be corrupted in a relatively innocent way, such as when a program is otherwise innocently introduced into a device having access to local resources, but where the program itself includes functions that attempt to access local resources in a way that is not desired.

It is therefore sometimes desirable to apply policy rules for handling messages in the network, particularly when those messages use a message protocol that might not be directed to business aspects of the network. For example, a number of message protocols have been developed recently that are primarily for personal use, but which often make their way into proprietary networks, such as enterprise networks, and which are subject to possible abuses. These message protocols include, for example, instant message (IM) protocols, peer-to-peer (P2P) and other file sharing protocols, interactive game protocols, distributed computing protocols, HTTP Tunneling, and ".NET" or "SOAP" methods of computer program interaction. Some of the possible abuses that can result from these message protocols entering the enterprise network include accidental delivery of a computer virus to a client device within the enterprise network, communication of sensitive or proprietary information between client devices within the enterprise network and client devices outside the enterprise network, and other unauthorized user behavior within the enterprise network.

Conventional methods of applying policy rules to messages in an enterprise network are directed primarily to relatively low-level message protocols such as TCP (transmission control protocol) and IP (Internet protocol). The protocols just described, however, typically are implemented at the higher levels of the TCP/IP protocol stack, as represented in the International Organization for Standardization (ISO) model. Often, in the interest of speed and finality, firewall servers, for example, are not very effective against message protocols that involve higher levels in the ISO model, or against message protocols that are relatively new to the enterprise network and therefore not anticipated by the firewall server. Moreover, many such protocols are being rapidly developed and modified, often more quickly than it is feasible to deploy new systems and methods for recognizing and intercepting those message protocols, and for enforcing policy rules thereto.

SUMMARY OF THE INVENTION

A protocol management system is capable of detecting certain message protocols and applying policy rules to the detected message protocols that prevent intrusion, or abuse, of a network's resources. In one aspect, a protocol message gateway is configured to apply policy rules to high level message protocols, such as those that reside at layer 7 of the ISO protocol stack.

In another aspect, the protocol management system is configured to intercept messages flowing into and out of the network and inspect the message protocol associated with the messages. If the message protocol matches a defined protocol template, then the message is forced to use the protocol message gateway so that policy rules for the message protocol can be applied.

In another aspect, the destination of a message heading out of the network to an external server, where the external server is configured to redirect the message to the destination, can be determined. If it is determined that the destination is within the network, then the message can simply be redirected to the destination.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
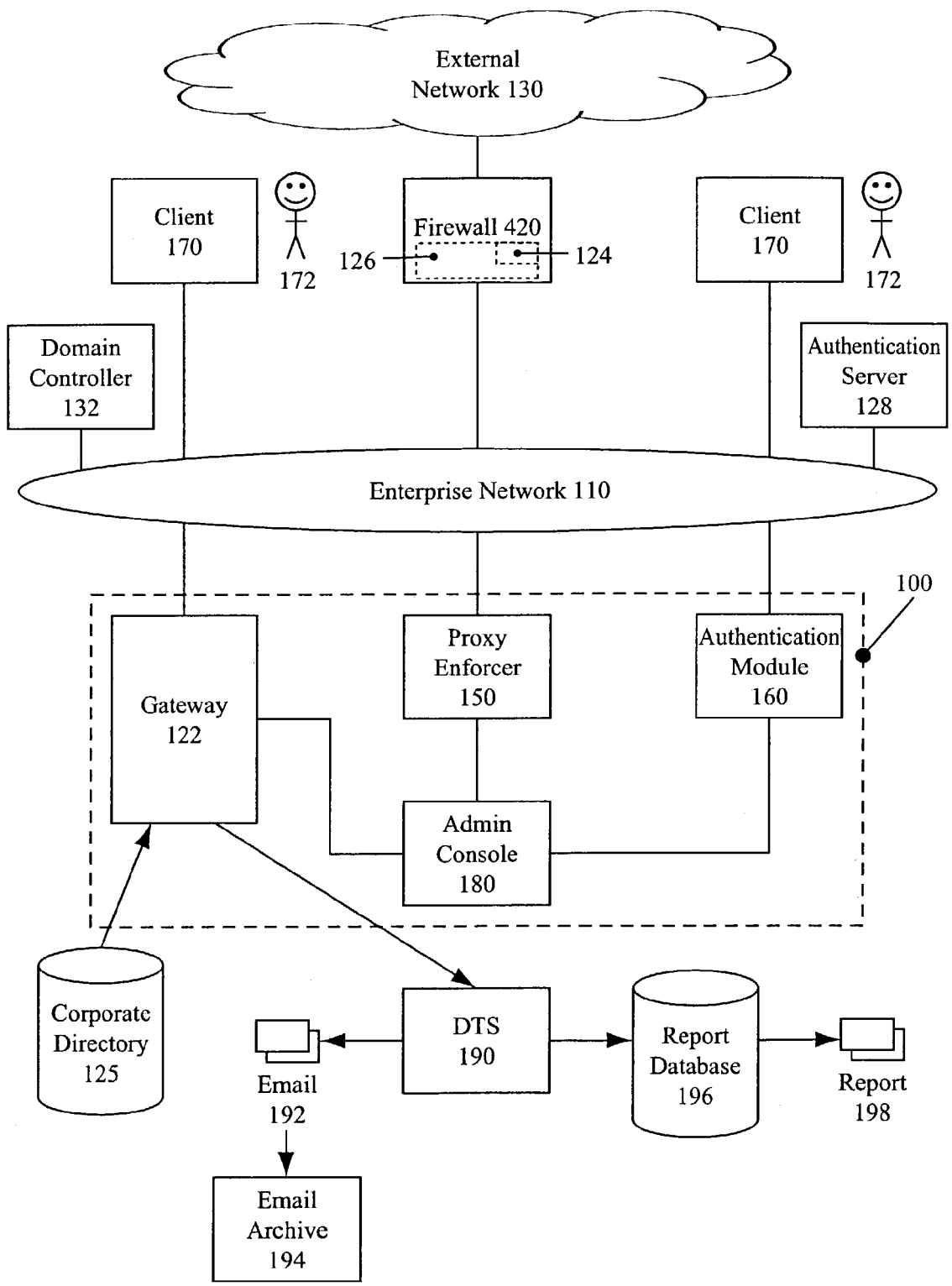
FIG. 1 depicts an exemplary embodiment of an enterprise network configured to incorporate a protocol management system.

FIG. 1 depicts an exemplary embodiment of an enterprise network 110 configured to interface with a protocol management system 100 in accordance with the systems and methods described herein. In the example of FIG. 1, enterprise network 110 is coupled to an external network 130 through a firewall 120. Enterprise network 110 can be coupled to at least one local client 170, configured to provide a user 172 access to enterprise network 110. In alternate embodiments, a proxy server (not shown) can be used in place of a firewall 120 to couple external network 130 to enterprise network 110.

As can be seen in FIG. 1, system 100 can comprise a protocol message gateway 122, a proxy enforcer 150, and an authentication module 160. Embodiments, deployments, and applications of protocol message gateway 122, proxy enforcer 150, and authentication module 160 are described below in greater detail.

As described herein, enterprise network 110 can include one or more internal networks such as a LAN (local area network), WAN (wide area network), locally switched network, or public switched network, some other communication technique, or some combination thereof, by which devices locally coupled to enterprise network 110 can communicate with each other. Although one embodiment is described herein in which enterprise network 110 includes a LAN, there is no particular requirement that enterprise network 110 include a LAN, or that any particular network configuration be employed.

External network 130 can include the Internet; however, in other embodiments external network 130 can also include an intranet, extranet, virtual private network (VPN), LAN, WAN, locally switched network or public switched network, some other communication technique, or some combination thereof. Although an embodiment is described herein where external network 130 including the Internet, there is no particular requirement that external network 130 use the Internet or any other specific type of network.

Firewall 120 can include a conventional device for recognizing and intercepting messages formatted at selected levels of the ISO layered protocol model, and meeting selected filtering criteria by which firewall 120 might determine whether those messages carry information intended to be received in a certain message protocol format.

In one embodiment of system 100, protocol message gateway 120, proxy enforcer 150, and authentication module 160 can be coupled to an administration console 180 that can be configured for use by a system administrator to set parameters and polices regarding certain protocols that are defined to be targets of system 100.

In addition, protocol message gateway 122, and proxy enforcer 150 in certain embodiments, can be coupled to a corporate database 125, which can be used to associate user screen names, or aliases, with a specific user within enterprise network 110. Protocol message gateway 120, and proxy enforcer 150, in certain embodiments, can also be coupled to a logging and archiving subsystem that comprises a data transport service 190. Data transport service 190 can be configured to convert protocol message logs into a relational model for reporting and, to record the logs into a report database 196 from which a report 198 can be generated. In certain other embodiments, such a report can even be converted to electronic mail that can be mailed to an administrator 192 or archived by an electronic mail archive service 194.

Figure 2:
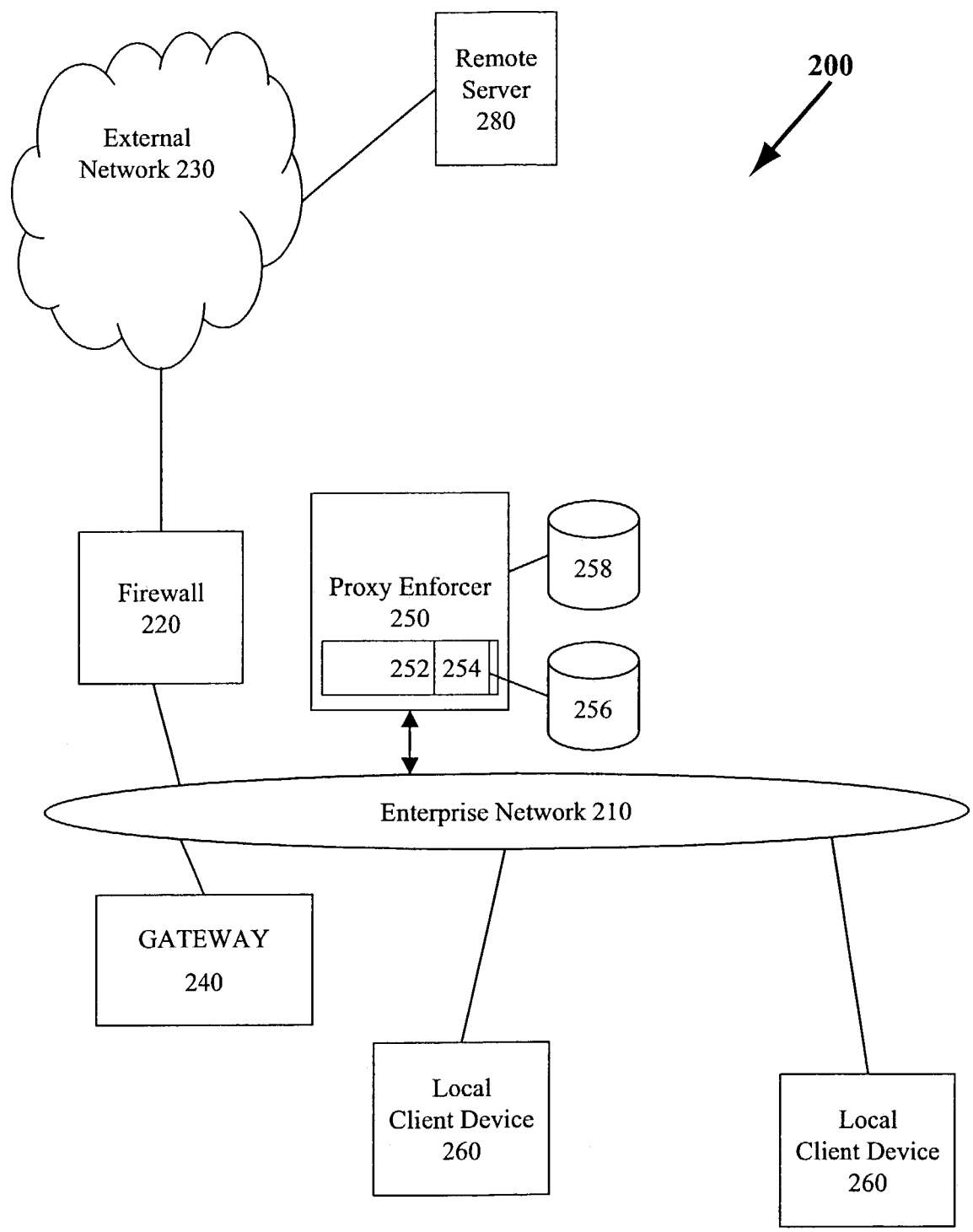
FIG. 2 shows a block diagram of a system including a proxy enforcer.

FIG. 2 is a block diagram illustrating a communication system 200 that includes a proxy enforcer 250 that is described in more detail. System 200 also includes an enterprise network 210, a firewall 220, an external network 230, a protocol message gateway 240, a proxy enforcer 250, and a set of client devices 260.

As will be explained below, protocol message gateway 240 can be configured to recognize messages that are using certain target protocols and implement policy rules associated with the target protocols. These target protocols can be high level, e.g., ISO level 7, protocols that would otherwise often escape detection while entering and exiting enterprise network 210. For example, these message protocols can often find un-monitored communication connections into and out of enterprise network 210, allowing the messages to escape detection. Proxy enforcer 250 can, however, be configured to intercept all messages traveling into and out of enterprise network 210 and force them to pass through defined communication connections, e.g., defined ports on protocol message gateway 240. This way, proxy enforcer 250 can ensure that all messages flowing into and out of enterprise network 210 are handled by protocol message gateway 240, as required, so that the appropriate protocol rule can be applied to the messages.

Thus, in one embodiment, proxy enforcer 250 can be coupled to firewall 220 and disposed so as to be able to passively listen to messages, including individual packets, flowing through firewall 220 into or out of enterprise network 210. Proxy enforcer 250 can include a set of enforcement rules 252 that are based on a set of protocol definition files 254. Each protocol definition file 254 can be a piece of executable code with intelligent heuristics that can recognize target protocols and manage state across multiple connections. For example, there can be an individual definition file 254 for every class or subtype of target protocol. An individual protocol definition file 254 can be different from other protocol definition files 254. Moreover, the set of enforcement rules 252 and protocol definitions files 254 can be expanded as necessary in response to different target protocols and different ways of handling target protocols. In one embodiment, additional enforcement rules 252 and protocol definition files 254 can be downloaded from a server interfaced with enterprise network 210. Thus, a system administrator, for example, can define new enforcement rules 252 and/or protocol definitions 254 and update proxy enforcer 250 as required.

The protocol definition files 254 act as a protocol template. Proxy enforcer 250 can be configured, therefore, to intercept messages in enterprise network 210 and to then compare them to the protocol template as defined by the protocol definition files 254. If a match occurs, proxy enforcer 290 can be configured to then implement the corresponding enforcement rule, or rules, 252. Unlike traditional virus recognition software that relies entirely upon matching patterns, proxy enforcer 250 can correlate two different messages or two different blocks within the same message, such as when a target protocol uses multiple ports and/or streams. This can be accomplished, for example, because even protocol definition file 254 can be configured to create it's own data structures and tables to store information relating to other ports, packets, and data streams.

A protocol definition file 254 can be configured to identify a target protocol in terms of a source IP address for the message; a destination IP address for the message; a port number associated with the message; a header string or other set of data values embedded in the message; or some combination thereof. Proxy enforcer 250 can also be configured to detect protocols of interest in response to a persistent state maintained by the proxy enforcer 250 in response to sequences of messages.

In operation, a remote server 280 coupled to external network 230 and can be configured to send and receive messages using a target protocol to and from client devices 260. For example, remote server 280 can be configured to communicate IM messages with a client device 260.

Proxy enforcer 250 can be configured to then passively listen to messages as they flow, e.g., through firewall 220. Proxy enforcer 250 can comprise a set of proxy enforcement rules 252, e.g., maintained in an enforcement rules database 256. When proxy enforcer 250 intercepts an IM message, i.e., a message that uses a target protocol, proxy enforcer will match the IM message using the proxy definition files 254. Proxy enforcer 250 can then execute the associated enforcement rule 252. The enforcement rule 252 can be configured to override aspects of the IM protocol associated with the intercepted IM message. For example, proxy enforcement rules 252 can require that IM messages pass through the protocol message gateway 240, which can be configured to act as a proxy for all IM messages.

Proxy enforcer 250 can be configured to then prevent the message from being effective if it does not adhere to proxy enforcement rules 252. One way proxy enforcer 250 can prevent a message 270 from being effective is to kill the communication connection between the service of the message and the destination, whether or not the message originates in enterprise network 210 or in external network 230. In alternative embodiments, proxy enforcer 250 can be configured to reset the communication connection associated with the message. In other embodiments, enforcement rule 252 can cause proxy enforcer 250 to record information related to the message. The recorded information can then be used to generate logs and/or reports as described below.

Figure 3:
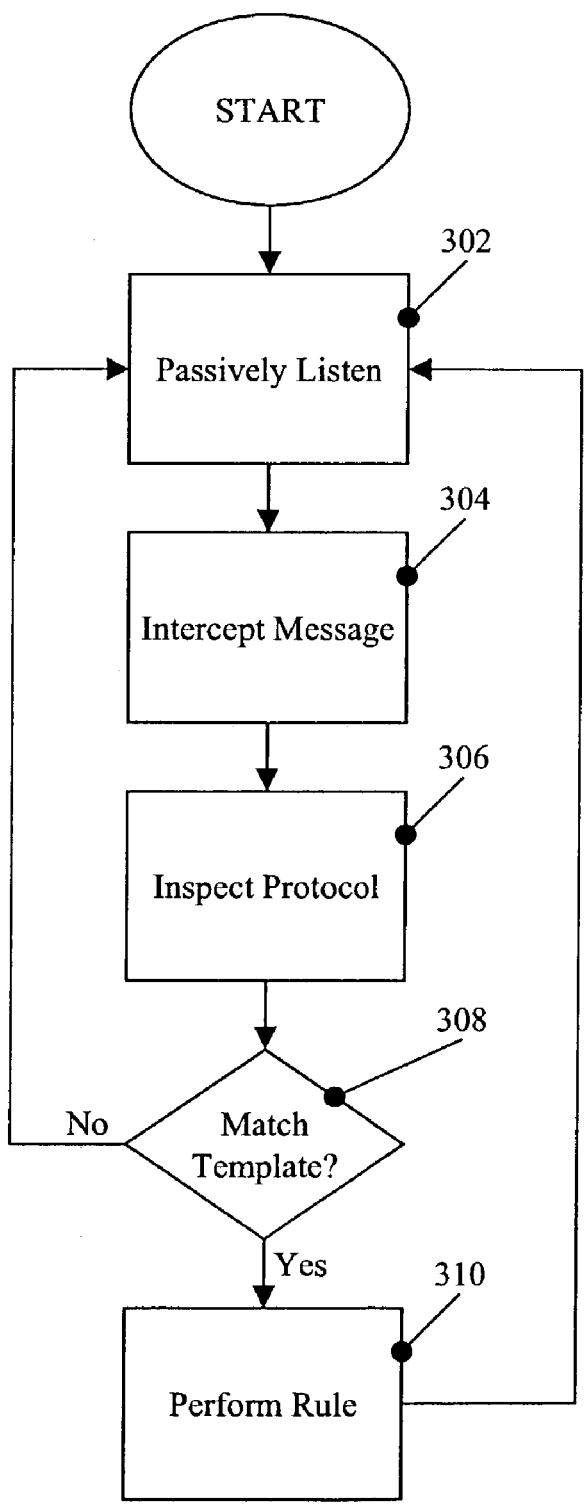
FIG. 3 shows a process flow diagram of a method including proxy enforcement.

FIG. 3 is a flow chart illustrating an example method for managing communication traffic in a network, such as enterprise network 210, using a proxy enforcer, such as proxy enforcer 250. 0First, in step 302, proxy enforcer 250 can be configured to passively listen to the messages comprising the communication traffic. Then, in step 304, proxy enforcer 250 can intercept a message and inspect the protocol associated with the message in step 306. Inspecting the message in step 306 can comprise determining information, such as a source IP address, a destination IP address, a port number, and a set of text associated with the message. In step 306, proxy enforcer 250 determines if the protocol matches a target protocol template, e.g., based on the information determined in step 306. The template can, as described above, be defined by one or more protocol definition files 254. If there is a match in step 303, then proxy enforcer 250 can be configured to execute the associated enforcement rule 252. If there is no match, then proxy enforcer 250 can be configured to continue passively listening (step 302).

Protocol definition files 254 can define a pattern of values associated with a message that uses a target protocol. Thus, proxy enforcer 250 can be configured to match (step 303) a pattern of values with data maintained in a message traffic database 258. Possible examples, e.g., include matching all traffic on port 5190, all traffic on port 8080 and including the string "?ymessage=", all traffic on port 8080 and including a string "?pword=%1", where, e.g., %1 is a value maintained in the message traffic database 258, and all traffic on 5190 that includes a string of five characters in incoming packet header, where the five characters as are, e.g., a signature of an instant message used in an IM protocol.

In certain embodiments, depending upon the type of enforcement rule 252 and type of match, further analysis of a message can be performed. This is particularly useful, for example, if the initial analysis suggests that the message is an IM masquerading as HTTP traffic.

In step 310, the proxy enforcer 250 performs the action associated with one of a plurality of triggered enforcement rules 252. In one embodiment, only the action associated with the first triggered enforcement rule 252 is performed; however, in alternative embodiments, more than one action may be performed, with the order of performance being responsive to an order in which enforcement rules 252 are maintained in enforcement rule database 256.

In certain embodiments, enforcement rules 252 include specific actions to take regarding the intercepted message, including possibly recording values in message traffic database 258. As explained above, possible examples of actions to be taken in response to enforcement rules 252 include killing the connection associated with the message, resetting the socket connections, recording the value %1 in message traffic database 258, where %1 is found in the string "?pword=%1" when matched and/or store the value %1 in a log so that the value can be recognized in the future, and parsing out the message text and storing the messages in a log associated with one or more individual users so that the messages and message text can be reviewed at a future point in time. This can be used, for example, to generate a record of unauthorized uses of a network, such as, employees downloading music files.

Thus, proxy enforcer 250, or similarly proxy enforcer 150, can be configured to ensure messages that use a target protocol pass through protocol message gateway 122. As can be seen in FIG. 1, firewall 120 can also include memory 126 configured to store a set of recognition patterns 124, which can also be referred to as "inspect scripts." Recognition patterns 124 can, for example, be selected by an administrator of firewall 120 and can include information sufficient to describe to firewall 120 messages using a target protocol.

Firewall 120 can be configured to then redirect, in response to recognition patterns 124, at least some of the messages it processes to protocol message gateway 122. In one embodiment, for example, messages can be redirected using a conventional content vectoring protocol (CVP) technique, in which, after processing the message and determining that it should be further processed by protocol message gateway 122, firewall 120 delivers the message to protocol message gateway 120. Redirection using CVP is described in more detail in conjunction with FIG. 6. Once protocol message gateway 122 receives a message, it can ensure that policy rules for the target protocol are employed to handle the message.

Figure 4:
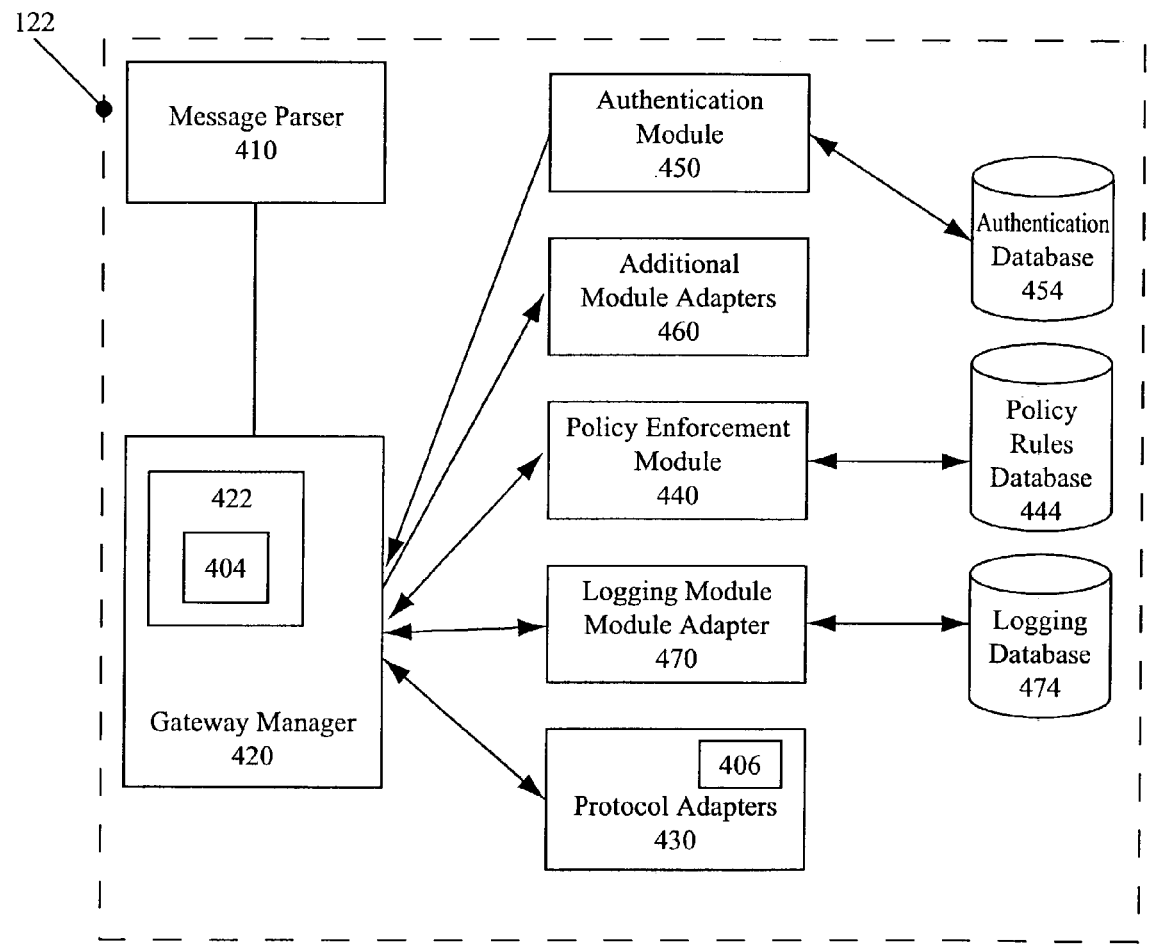
FIG. 4 shows a block diagram of a gateway capable of protection against protocols of interest.

FIG. 4 is a diagram illustrating one embodiment of protocol message gateway 122 in more detail. As can be seen, protocol message gateway 122 can include a protocol message parser 410, a gateway manager 420, a set of protocol adapters 430, a policy enforcement module 440, an authentication module 450, and a set of additional module adapters 460.

In one embodiment, protocol message parser 410 is coupled to firewall 120 using a conventional CVP technique, as described above. Protocol message parser 410 can thus receive a target message from firewall 120. Protocol message parser 410 parses the received message and determines which of the set of protocol adapters 430 is appropriate for processing the received message. Protocol message parser can be configured to then forward the message to gateway manager 420. In certain embodiments, protocol message gateway 122 can include more than one protocol message parser 410. Inclusion of a plurality of protocol message parsers allows for relatively easy and efficient scaling of the ability for protocol message gateway 122 to receive large numbers of target messages, and to both parse and distribute those messages to gateway manager 420 without substantial degradation in either accuracy or response time.

Gateway manager 420 receives the parsed message and creates any necessary data structures 422 associated with the message. Among these data structures 422, gateway manager 420 can be configured to create a new message event 404, which it can publish to protocol adapters 430 and module adapters 460 that indicate an interest in receiving message event 404. When publishing message event 404, gateway manager 420 can include information relevant to the parsed message, such as the appropriate protocol adapter 430 to handle the message, and any other identifying information regarding the message, such as a user, user name, screen name associated with the message, etc.

In one embodiment, gateway manager 420 determines which protocol adapter 430 is the appropriate one to handle the message. The appropriate protocol adapter 430 can then receive the message and its associated message event 404, and can determine how the message fits into the processing paradigm for the associated message protocol. For example, if the message initiates a session between a sender and receiver, such as a sender and receiver of an IM message, protocol adapter 430 can determine that a new session should be created, and generate a new session event 406. In this example, data structures 422 generated and used by the gateway manager 420 would include a session data structure as part of data structures 422; the session data structure would include information relevant to the communication session between a sending client device 170 and a receiving client device using the associated message protocol.

Protocol adapter 430 assigned to handle the message can be configured to send any new events 406 it generates to gateway manager 420 for publishing to any protocol adapters 430 or module adapters 460 that have indicated interest in that particular message or message event 406.

Inclusion of more than one protocol adapter 430 in protocol message gateway 122 allows for relatively easy and efficient scaling of protocol message gateway 122 to receive large numbers of messages, and to individually process those messages within protocol message gateway 122 without substantial degradation in either accuracy or response time. Further, the use of multiple protocol adapters 430, each specifically designed for a different variant of a set of similar target protocols, allows client devices 170 to communicate using the different variants, without any need for special translation on the part of protocol message gateway 122 and without any need for alteration of client devices 170.

Again, gateway manager 420 can be configured to publish any message events 406 to any protocol adapters 430 or module adapters 460 that indicate interest the message events 406. Among the protocol adapters 430 or module adapters 460 that can indicate interest are, for example, policy enforcement module 440, authentication module 450, and selected other additional module adapters 460.

Authentication module 450 can be configured to receive any session events 406 so that authentication module 450 can authenticate any screen names associated with the associated message. As described in more detail below, authentication module 450 can be configured to uniquely identify an actual user associated with any such screen name, record that identifying information in a user database 454 associated with authentication module 450, and send that identifying information to gateway manager 420 for inclusion in any data structure 422 maintained by gateway manager 420 for the session event 406.

Protocol message gateway 122 can also include a logging module 470 that can be configured to provide capability for logging messages as they are received by protocol message gateway 122 from a sending client devices 170, and as they are forwarded by protocol message gateway 122 to receiving client device 170, or to a client device on external network 130. In other words, logging module 470 provides a capability for maintaining a persistent log of all messages exchanged across protocol message gateway 122. In one embodiment, logging module 470 can be configured to output a log to a logging database 474 from which database searches can be conducted and reports generated. In another embodiment, logging module 470 can be configured to output log information to logging database 474 in an encrypted format, so as to restrict access to information in logging database 474 to those devices 170 associated with logging module 470, or possibly those devices 170 associated with gateway 122, that have been assigned access to logging database 474. Access can, depending on the embodiment, be assigned using appropriate keys for the encrypted format used to encrypt the information.

Logging module 470 provides a way to record messages comprising what is otherwise evanescent communication between sending client devices 170 and receiving client devices. Such persistent recording allows for forensic investigation of communication between those client devices. Similarly, such persistent recording also allows for compliance with any regulatory requirements or other administrative rules requiring maintenance of records of communications between such client devices. For example, a sending client device 170 and a receiving client device may be controlled by users in disparate departments of a financial institution. Regulatory requirements can demand that communications between such users avoid certain topics, such as communication regarding analysis or recommendation of selected securities. Logging such communications can help ensure that any such requirements are adhered to.

Protocol message gateway 122 can, depending on the embodiment, also include a policy enforcement module 440. Policy enforcement module 440 can be configured to receive information regarding each message, and to determine whether or not a specific message should be forwarded in unaltered form from sending client device 170. Policy enforcement module 440 can have access to a policy rules database 444 that includes specific policy rules responsive to at least one of certain classes of information including: the nature of sending client device 170; the nature of the receiving client device; the nature of the message; any information, including keywords, included within the message; the day of the week, or a time of day, at which the message was sent or is intended to be received; the size of the message, including whether or not the message includes an attachment, an executable file attachment, an executable file attachment including a virus, and the like; the amount of traffic already sent by sending client device 170, or already received by the receiving client device, within a selected duration of time; or any other classes of information deemed relevant by administrators of enterprise network 110.

In certain embodiments, protocol message gateway 122 can be administrated from one or more logically remote administrator consoles 180, which can be coupled to enterprise network 110, to another network that is coupled to external network 130, or to external network 130 itself. The use of remote administrator consoles 180 can allow various modules and adaptors included in protocol message gateway 122 to be dynamically updated from a remote location. For example, dynamic policy rules database 444 can be dynamically altered from a administrator console 180 in substantially real-time, which can allow real-time updates concerning target protocols. Given how quickly dangerous, or harmful, protocols can pop up, and the need to deal with such protocols as quickly as possible, such dynamic update capability can be invaluable. Further, the fact that dynamic updates can be performed remotely, even through external network 130, can be even more invaluable since network administrators cannot always be present to protect their enterprise networks 110.

Figure 5:
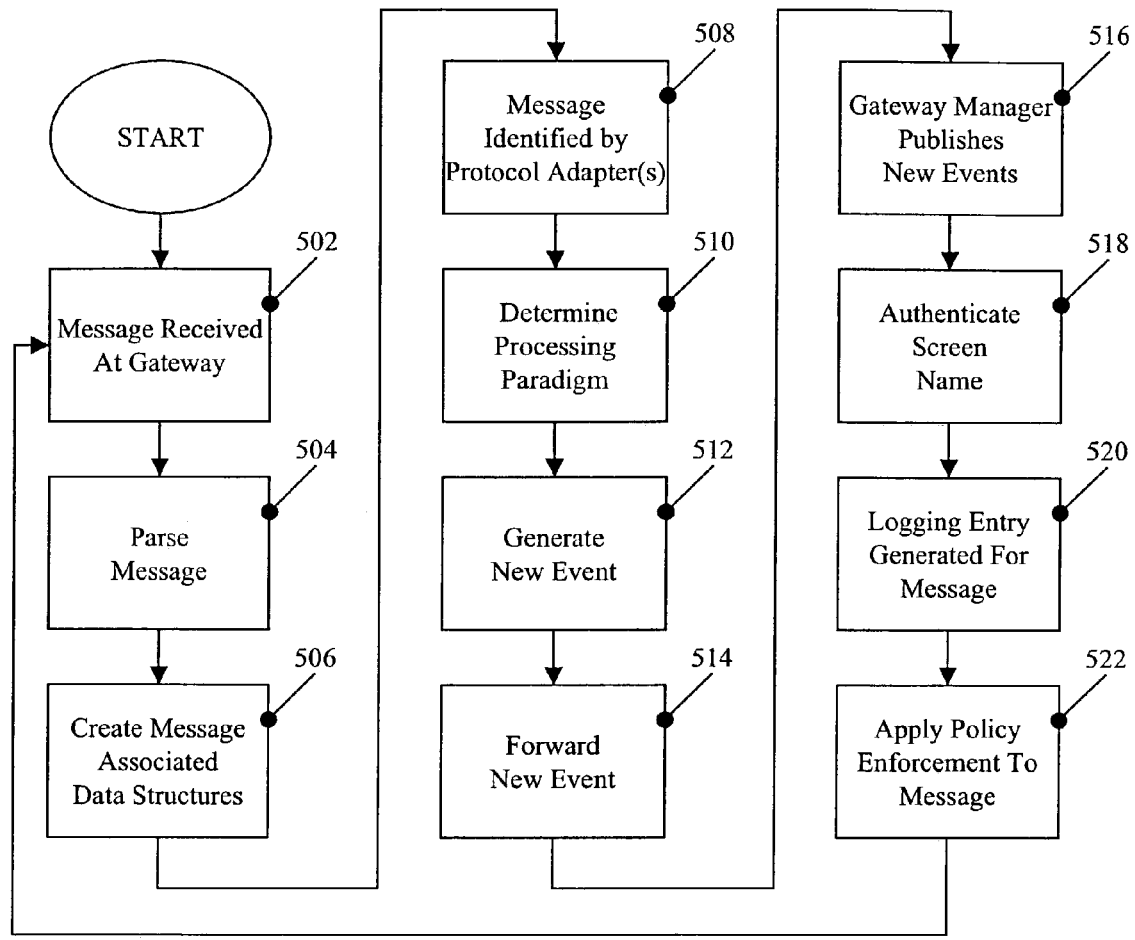
FIG. 5 shows a process flow diagram of a method of operating a gateway capable of protection against protocols of interest.

FIG. 5 is a flow chart illustrating an example method whereby a protocol message gateway 122 can manage communication traffic in a network, such as enterprise network 110. First, in step 502, protocol message gateway 122 can receive a message and direct the received message to a protocol message parser 410, which can be configured to parse the message in step 504 and determine which of a set of protocol adapters 430 is appropriate for processing the message. As part of step 504, protocol message parser 410 can be configured to forward the message to a gateway manager 420 for further processing.

In step 506, gateway manager 420 can receive the parsed message and create any necessary data structures 422 associated with the message. As noted above, among these data structures 422, gateway manager 420 can be configured to create a new message event 404, which it can publish to those protocol adapters 430 and those module adapters 460 that have indicated interest in receiving message event 404. As noted further above, when publishing message event 404, gateway manager 420 can include information relevant to the message, such as the appropriate protocol adapter 430 to handle the message, and any other identifying information regarding the message, such as a user, user name, or screen name associated with the message.

In step 508, at least one protocol adapter 430 recognizes the message and determines how the message fits into the processing paradigm for an associated message protocol in step 510. In step 512, the protocol adapter 430 can be configured to generate any new events 406 it deems appropriate in response to how the message fits into the processing paradigm for the associated protocol. Any such new events 406 generated by the protocol adapter 430 can then be sent to gateway manager 122 in step 514.

In step 516, gateway manager 122 can publish new events 406 to protocol adapters 430 or any other module adapters that have indicated interest in those classes of events 406.

Authentication module adapter 450 can then receive any new session event 406, in step 518, and authenticate any screen name associated with the associated message.

In step 520, logging module adapter 470 can generate a logging entry for the message and output a log to a logging database 474 from which database searches can be conducted and reports can be generated. As noted above, logging module adapter 470 can output the log information for logging database 474 in an encrypted format.

In step 522, policy enforcement module 440 can receive information regarding each message, and determine whether or not a specific message should be forwarded in unaltered form from sending client device 170 to the receiving client device. As noted above, policy enforcement module 440 can have access to a policy rules database 444, including specific policy rules responsive to at least one of, and possibly more than one of, a number of classes of policy information.

Figure 6:
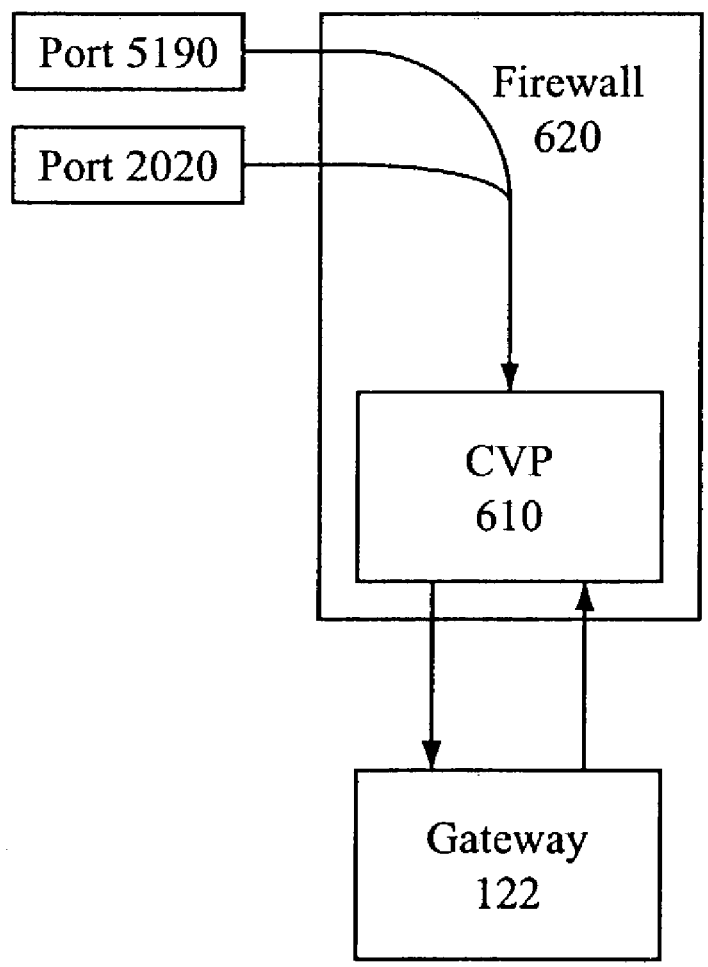
FIG. 6 shows a block diagram of the deployment of a protocol message gateway using the CVP method.

There are several deployment options that can be used when implementing a protocol message gateway 122. For example, FIG. 6 is a block diagram illustrating the deployment of a protocol message gateway 122 using the CVP method discussed above. Thus, firewall 620 can comprise a CVP API 610, which can be coupled to protocol message gateway 122. Firewall 620 can then be configured to have a CVP interface mechanism through which an external server can be coupled, which in this case is protocol message gateway 122. Firewall 620 can direct messages from, e.g., communication port 5190 or from communication port 2020, to protocol message gateway 122 through the CVP interface mechanism using CVP API 610.

Figure 7:
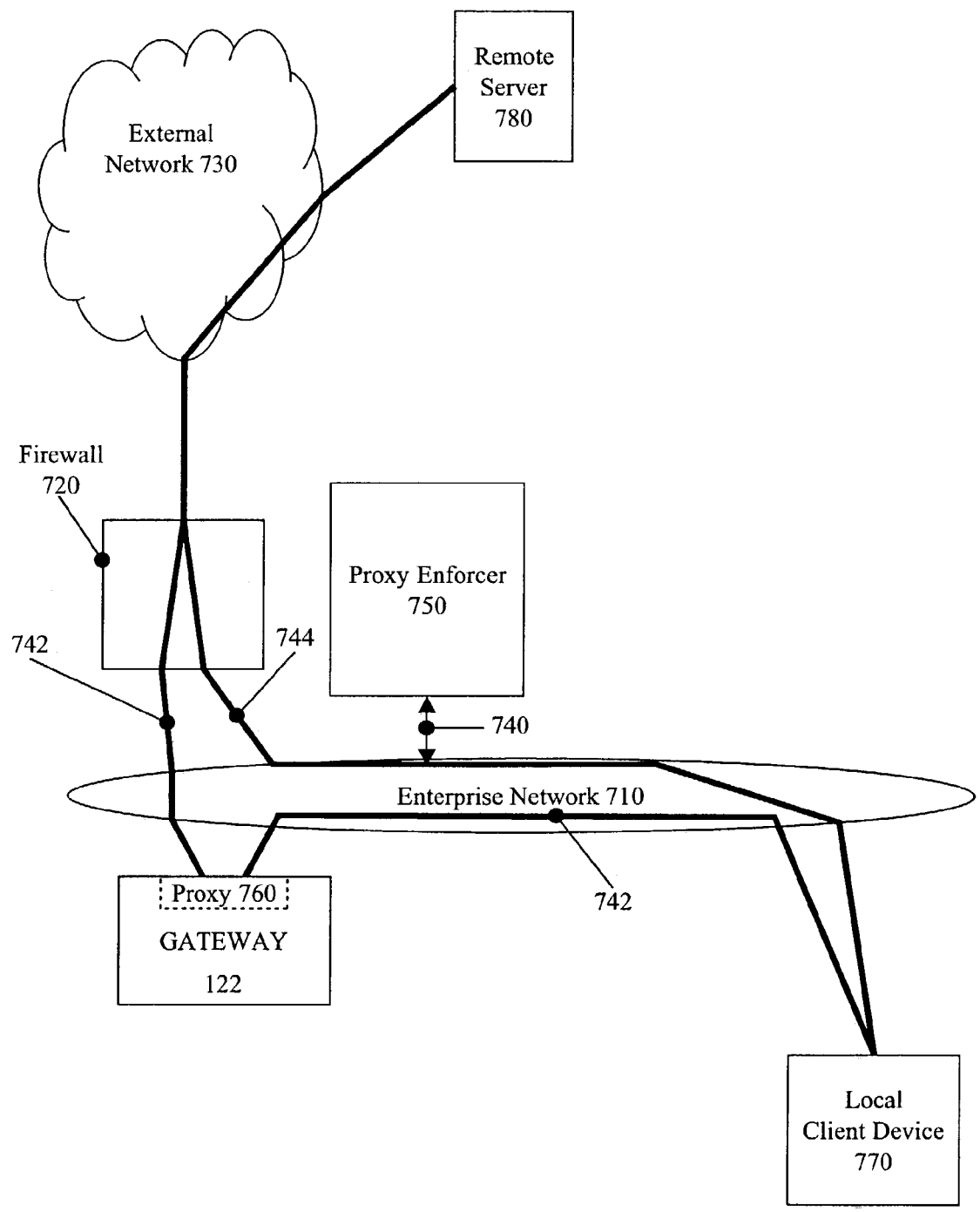
FIG. 7 shows a block diagram illustrating the deployment of a protocol message gateway using the gateway proxy method.

Alternatively, FIG. 7 is a block diagram illustrating the deployment of a protocol message gateway using a gateway proxy method in accordance with another embodiment of the systems and methods described herein. In the example of FIG. 7, protocol message gateway 122 comprises a proxy module 760. In general, a proxy can be a server, or component of a server, configured to relay a message comprising any protocol to and from a client, such as local client device 770 to a server, such as remote server 780. Proxies can be used to shield a client device 770 from intrusion from external network 730. Proxies can also be used as a controlled portal through a firewall 720 or gateway, such as protocol message gateway 122. Thus, a protocol message gateway 122 equipped with a proxy module 760 can be configured to permit protocol message gateway 122 to act as a proxy and examine any messages within network 710.

Each client application on each local client device 770 should, however, be configured to use protocol message gateway 122 as a proxy. Without such configuration, local client device 770 can communicate with remote server 780 by traversing enterprise network 710, the firewall 720, and external network 730 as shown by path 744. Thus, an uncooperative, or uneducated user could willingly, or unknowingly bypass the protocol message gateway 122 and a direct path, such as path 744, to communicate with remote server 780. To help avoid this possibility, the firewall 720 can be configured to block all communications except those originating from proxy 760. Unfortunately, conventional firewalls 720 are not equipped to detect some more elusive protocols such as certain IM protocols. Accordingly, a proxy enforcer 750 can be used to ensure that messages traveling within network 710 use protocol message gateway 122 as described above.

Thus, with the unauthorized paths blocked, a user can only connected to remote server 780 via proxy 760 by path 742, as allowed by protocol message gateway 122. With all, communication traffic flowing through proxy module 760 protocol message gateway 122 can monitor all traffic for target protocols and enforce any policies for said protocols as described above.

For convenience, scripts can be executed on a local client device 770, each time a user logs on. The scripts ensure that all client applications running on device 770 have protocol message gateway 122 as a proxy. The scripts give an added convenience to the users in that they do not have to manually configure their proxies. Moreover, the scripts can be updated remotely using administrator workstations 120, for example.

Figure 8:
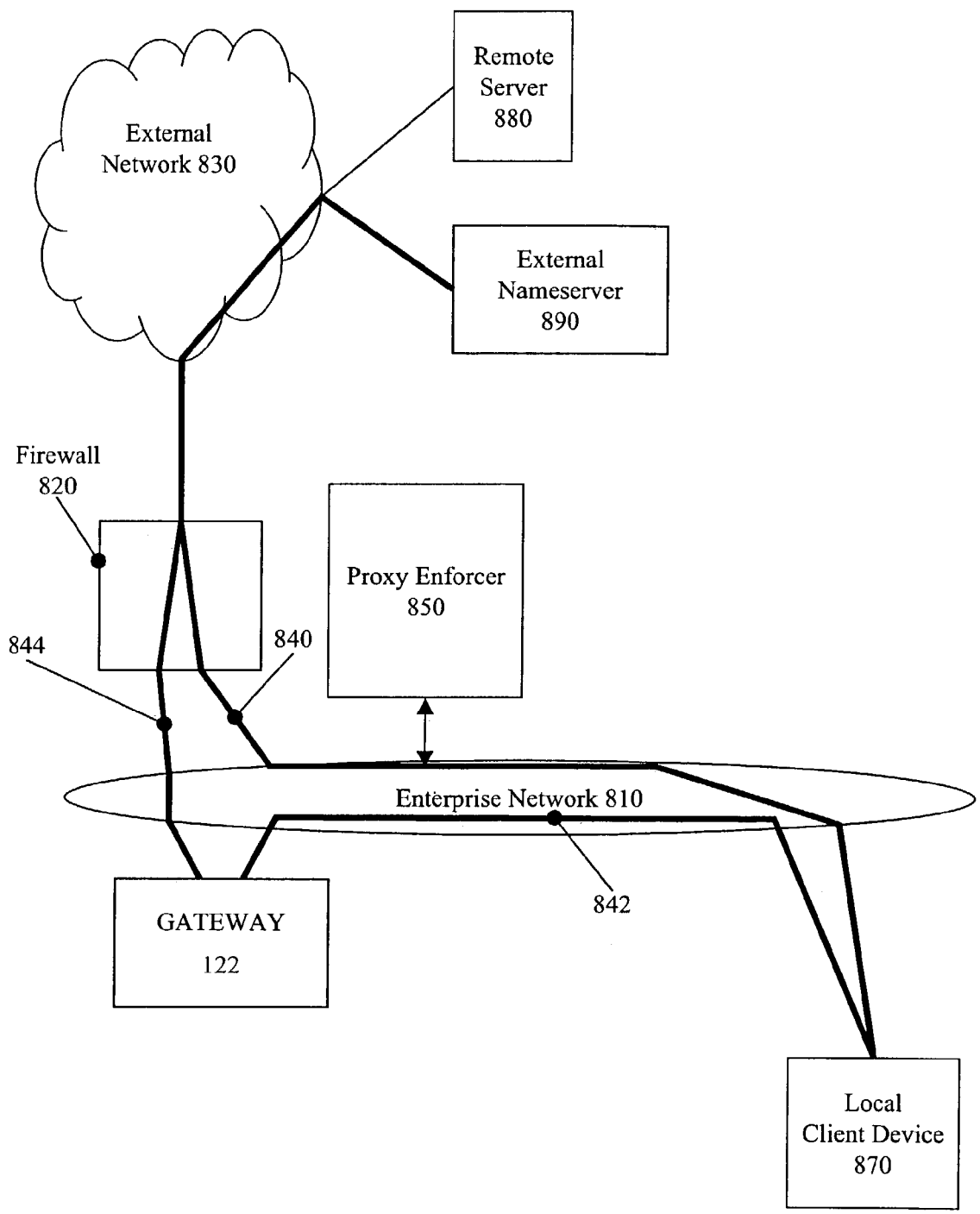
FIG. 8 shows a block diagram illustrating the deployment of a protocol message gateway using the DNS redirect method where only an external nameserver is used.
Figure 9:
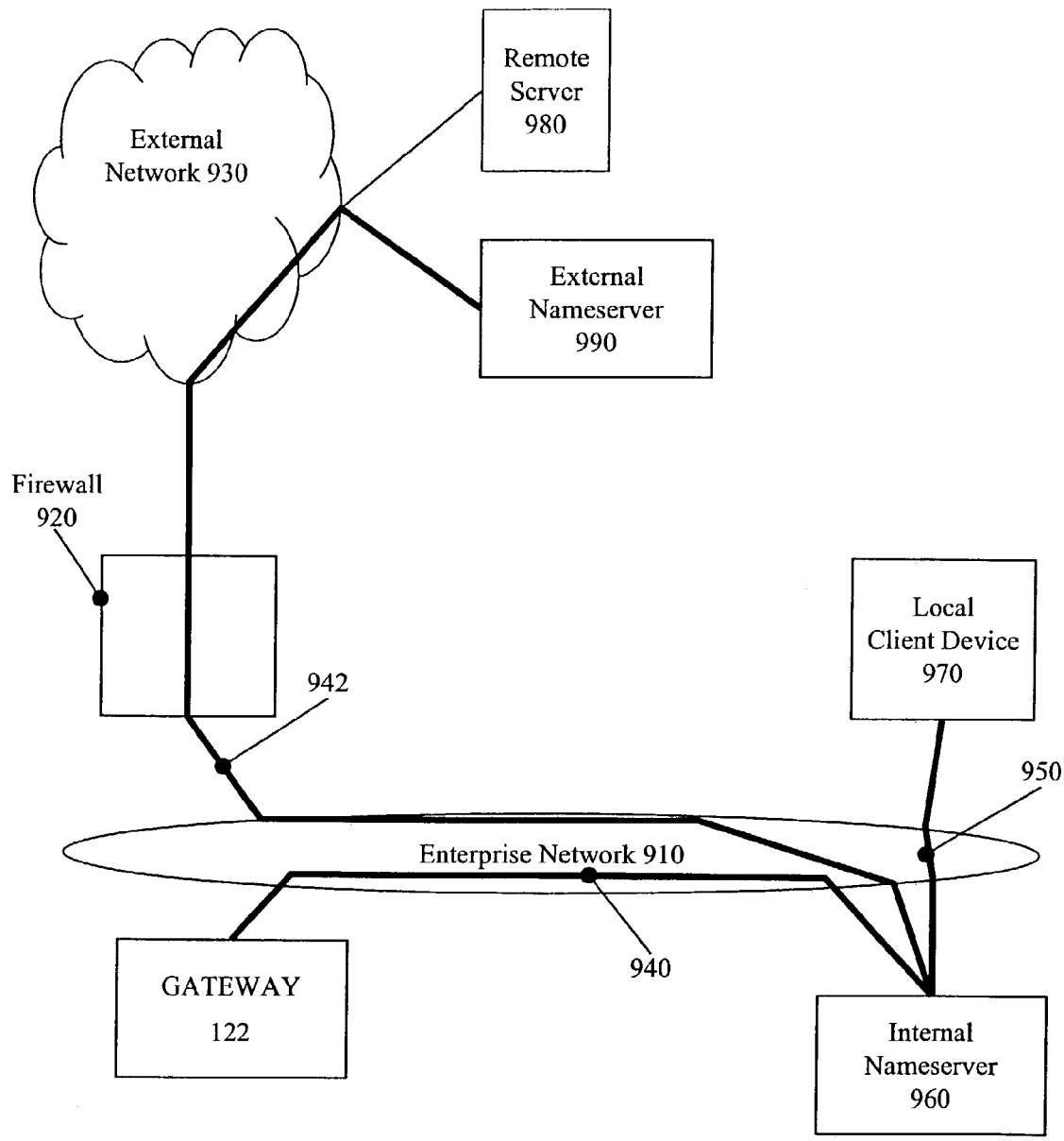
FIG. 9 shows a block diagram illustrating the deployment of a protocol message gateway using the DNS redirect method where an internal nameserver is used by all client devices inside an enterprise network.

FIG. 8 and FIG. 9 illustrate the deployment of a protocol message gateway 122 using a domain name service (DNS) redirection technique in accordance with alternative embodiments of the systems and methods described herein. Often in communicating over a network a client communicates to a server identified by a hostname. At the inception of communications, the client request a nameserver to resolve the hostname. If found, the nameserver responds with the network address of the server. In the embodiments of FIGS. 8 and 9, the client is given the address for gateway 122 each time the hostname for certain servers is requested.

FIG. 8 shows a block diagram illustrating a deployment of a protocol message gateway using DNS redirection, where only an external nameserver 890 is used. External nameserver 890 is connected to external network 830. A normal DNS request can then be made through path 840 from a client device 870 to external nameserver 890. Using either a proxy enforcer 850, or firewall 820, the DNS requests can be blocked and the client device forced to use protocol message gateway 122 for the DNS request as a DNS proxy. If client device 870 requests a suspect hostname through path 842, protocol message gateway 122 can be configured to give its own address as the corresponding address to that host thereby spoofing client 870 into believing protocol message gateway 122 is remote server 880. Protocol message gateway 122 can then relay messages to remote server 880 and monitor and regulate communications therewith. If the hostname is not know to be one belonging to a certain server, e.g., a server associated with a target protocol, the gateway 122 make a request to external nameserver 890 through path 844 and respond to client device 870 with the response given by external nameserver 890.

FIG. 9 shows a block diagram illustrating the deployment of a protocol message gateway using DNS redirection, where an internal nameserver 920 is used by all client devices 970 inside an enterprise network 910. Internal nameserver 920 can, for example, be coupled to enterprise network 910. Local client devices 970 can make DNS requests through path 950 to resolve the addresses of hostnames of servers. In order to keep the address list up to date internal nameserver 960 can periodically synchronize over path 942 its address list with an external nameserver 990, which is connected to external network 930, in what is referred to as a "zone transfer." To supplement this, protocol message gateway 122 can supply, via path 940, alternate hostnames to internal nameserver 960 to redirect DNS requests for hostnames of servers associated with target protocols.

FIG. 8 and FIG. 9 are given as exemplary embodiments of systems deploying protocol message gateway 122 using DNS redirection method. In will be understood, however, that numerous equivalent topologies and nameserver protocols can be used to achieve a redirection through DNS spoofing.

Figure 10:
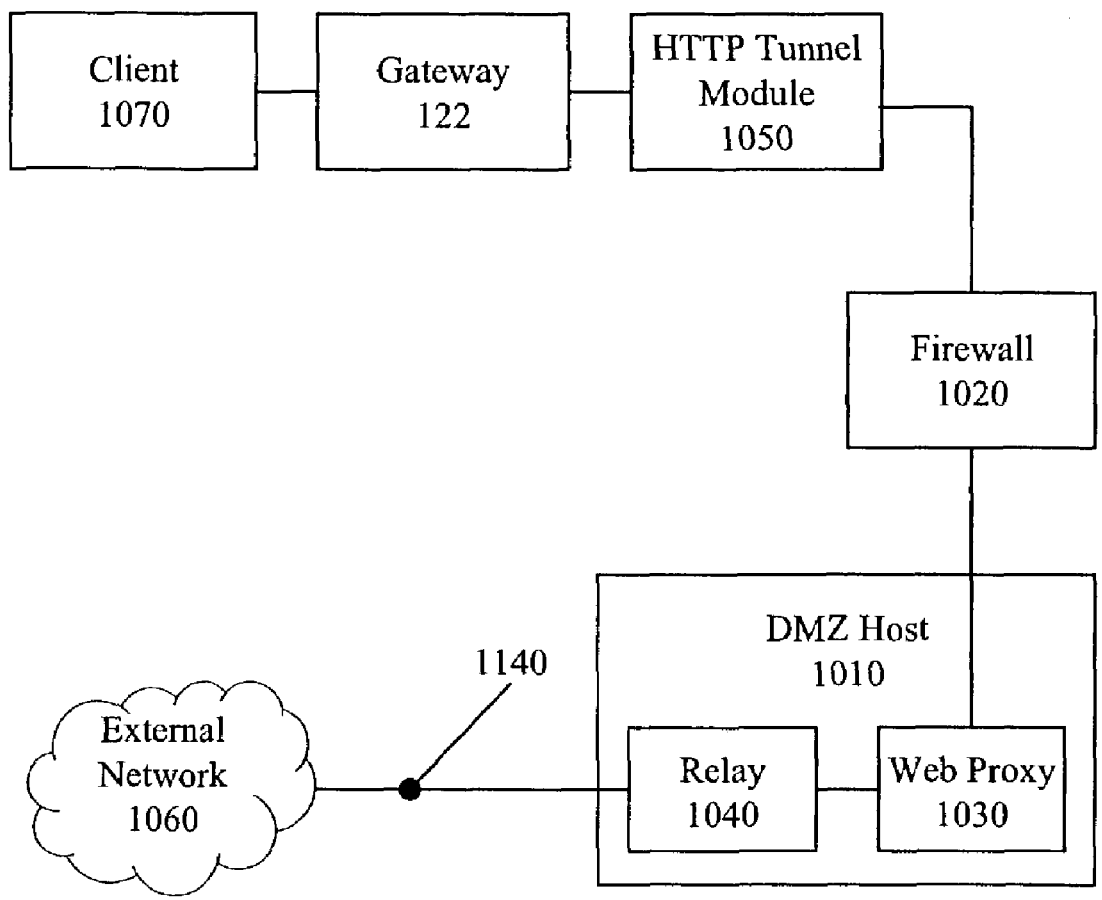
FIG. 10 shows a block diagram illustrating the deployment of a protocol message gateway using an HTTP tunnel method.

FIG. 10 is a block diagram illustrating the deployment of a protocol message gateway 122 using an HTTP tunnel method. The deployment illustrated in FIG. 10 can be used, for example. When firewall 1020 is configured to block all external access to the internet except for HTTP. In such a situation, firewall 1020 can be coupled to a "Demilitarized Zone" (DMZ) host 1010 that can be configured to act as a virtual presence on an external network 1060, i.e. all access to and from external network 1060 goes through DMZ host 1010. When a local client device 1070 sends a message destined for external network 1060, the message can be forced to first pass through protocol message gateway 122, which can, for example, be configured to perform the functions described above. The message can then be configured to appear as an HTTP message by HTTP tunnel module 1050. This way, for example, the message can pass through firewall 1020.

HTTP tunnel module 1050 also can be configured as a standalone module or it can be incorporated into protocol message gateway 122 depending on the embodiment. If fact, HTTP tunnel module 1050 can reside anywhere with the enterprise network, including within firewall 1020, as long as it is configured to perform the functions described herein.

Once HTTP tunnel module 1050 has formatted the message, it can be passed through firewall 1020 to, e.g., a web proxy 1030, which can, for example, be included as part of DMZ host 1010. Web proxy 1030 can be configured to forward the message to a relay 1040, which can be configured to undo the HTTP formatting, as required, and forward the message out to external network 1060.

Figure 11:
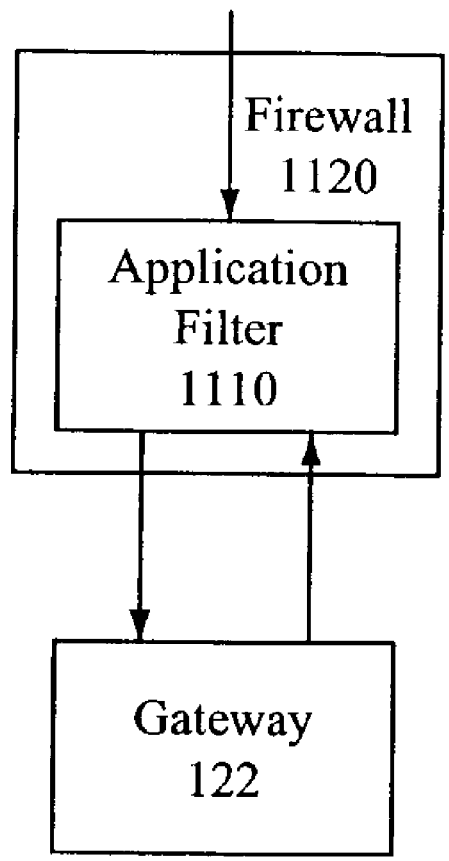
FIG. 11 shows a block diagram illustrating the deployment of a protocol message gateway using the ISA application filter method.

FIG. 11 is a block diagram illustrating the deployment of a protocol message gateway 122 using an ISA application filter method, which is similar to deployment using a CVP method. Thus, firewall 1120 can comprise an ISA application filter 1110 which can be configured to forward messages comprising a target protocol to protocol message gateway 122.

Thus, protocol message gateway 122 configured to adapt and enforce message protocols associated with messages within an enterprise network, or within some other local network, can be deployed in a variety of ways including those described in the preceding paragraphs. Further, a proxy enforcer, such as proxy enforcer 150, can be deployed within the enterprise network to force messages traveling within the network to pass through such protocol message gateway 122. Proxy enforcer 150 can also be configured to terminate a communication connection when it is unable to force a message to pass through protocol message gateway 122. Alternatively, proxy enforcer 150 can be configured to reset a communication connection associated with a message that cannot be forced through protocol message gateway 122, to log information associated within messages being forced through protocol message gateway 122, and/or to generate reports related to any messages being forced through protocol message gateway 122.

As can be seen in FIG. 1, protocol management system 100 can also include an authentication module 160. Authentication module 160 can be configured to identify the identity of users within enterprise network 110 from screen names, or aliases, being used by target protocols for associated messages being passed into and out of enterprise network 110. For example, IM applications often use a screen name as an alias for a user. Messages generated by the IM application then comprise the screen name. It can be useful when adapting or enforcing policies using protocol message gateway 122 to identify the actual user associated with a screen name. Authentication module 160 can be configured to perform such identifications. Moreover, authentication module 160 can be configured to store the identifying information so that it can be retrieved later when handling, e.g., IM messages generated by the same user using already identified screen names.

Figure 12:
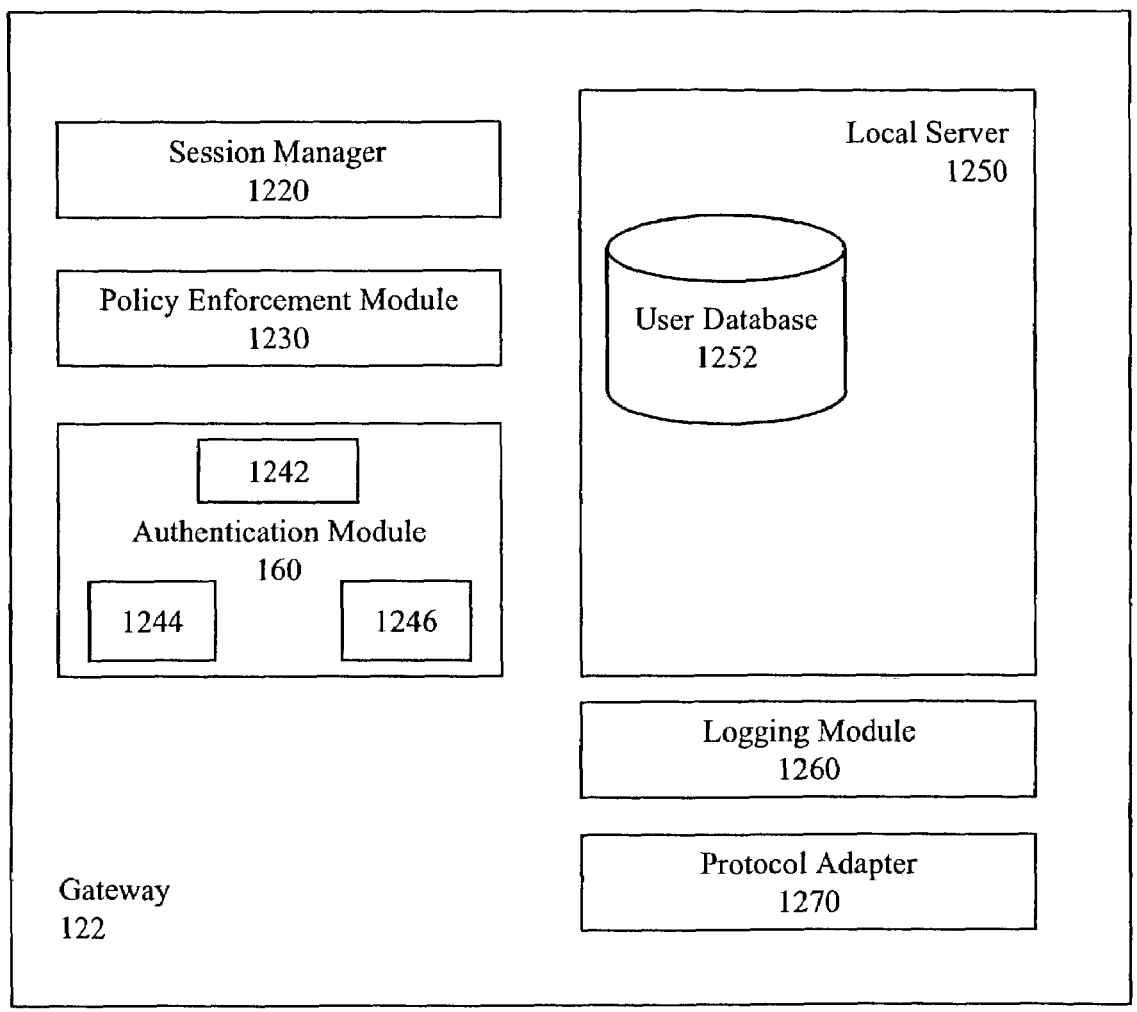
FIG. 12 shows a block diagram of a local server capable of associating screen names with users of protocols of interest.

FIG. 12 is a diagram illustrating one embodiment of authentication module 160 configured in accordance with the systems and methods described herein. As can be seen in the example embodiment of FIG. 12, authentication module 160 can comprise part of a protocol message gateway 122. Alternatively, authentication module 160 can act as a standalone module separate from protocol message gateway 122 as illustrated in FIG. 1. In such an implementation, authentication module 160 can, for example, be loaded onto a separate server, or local client device interfaced with enterprise network 110. Similarly, protocol message gateway 122 can comprise the local server 1250 comprising a user database 1252. Again, in alternative embodiments, local server 1250 and user database 1252 can reside outside of protocol message gateway 122 as required by the particular embodiment. User database 1252 can be configured to maintain an association between user names and screen names, or aliases, used by target protocols within enterprise network 110.

In one embodiment, as described above, protocol message gateway 122 can include a session manager 1220, capable of receiving messages intercepted from client devices 170. Session manager 1220 can be configured to parse intercepted messages, and determining the message protocol associated therewith. Session manager 1220 can also be configured to send the message, or information equivalent thereto, to local server 1250, which can be configured to generate a new-session event 1244, indicating the receipt of a message. In certain embodiments a plurality of local servers 1250 can be included, e.g., each adapted for processing of a different type of target protocol.

Session manager 1220 can be configured to then distribute session event 1244 to one or more other modules within protocol message gateway 122, such as authentication module 160. Authentication module 160 can be configured to receive session event 1244 and send a name-request message 1246 to an authorization server 128 and receive a name-response message 1242 from authorization server 128.

For example, name-request message 1246 sent by authentication module 160 to authorization server 128 can include an IP address for the client device 170 sending the message. The name-response message 1242 sent by authorization server 128 to authentication module 160 can then include a unique user name associated with the client device 170 sending the message. Once name-response message 1242 is received, authentication module 160 can be configured to first determine if the session associated with session event 1244 is still active. If it is, then authorization module 160 can associate the unique user name with a screen name associated with the message and store the association in user database 1252. When subsequent messages are received that comprise the same screen name, authentication module 160 can simply access the association information from user database 1252 in order to identify the actual user sending the message.

A policy enforcement module 1230, protocol adapter 1220, and logging module 1260 can then process the message based on the identification of the user. For example, policy enforcement module 1230 can determine whether to allow the message to be forwarded to its originally intended destination based on the identification of the user sending the message.

Multiple screen names can be associated with a single user. Thus, the identification information stored in user database 1292 can comprise a complete association of all screen names, or aliases, used by a particular user.

Figure 13:
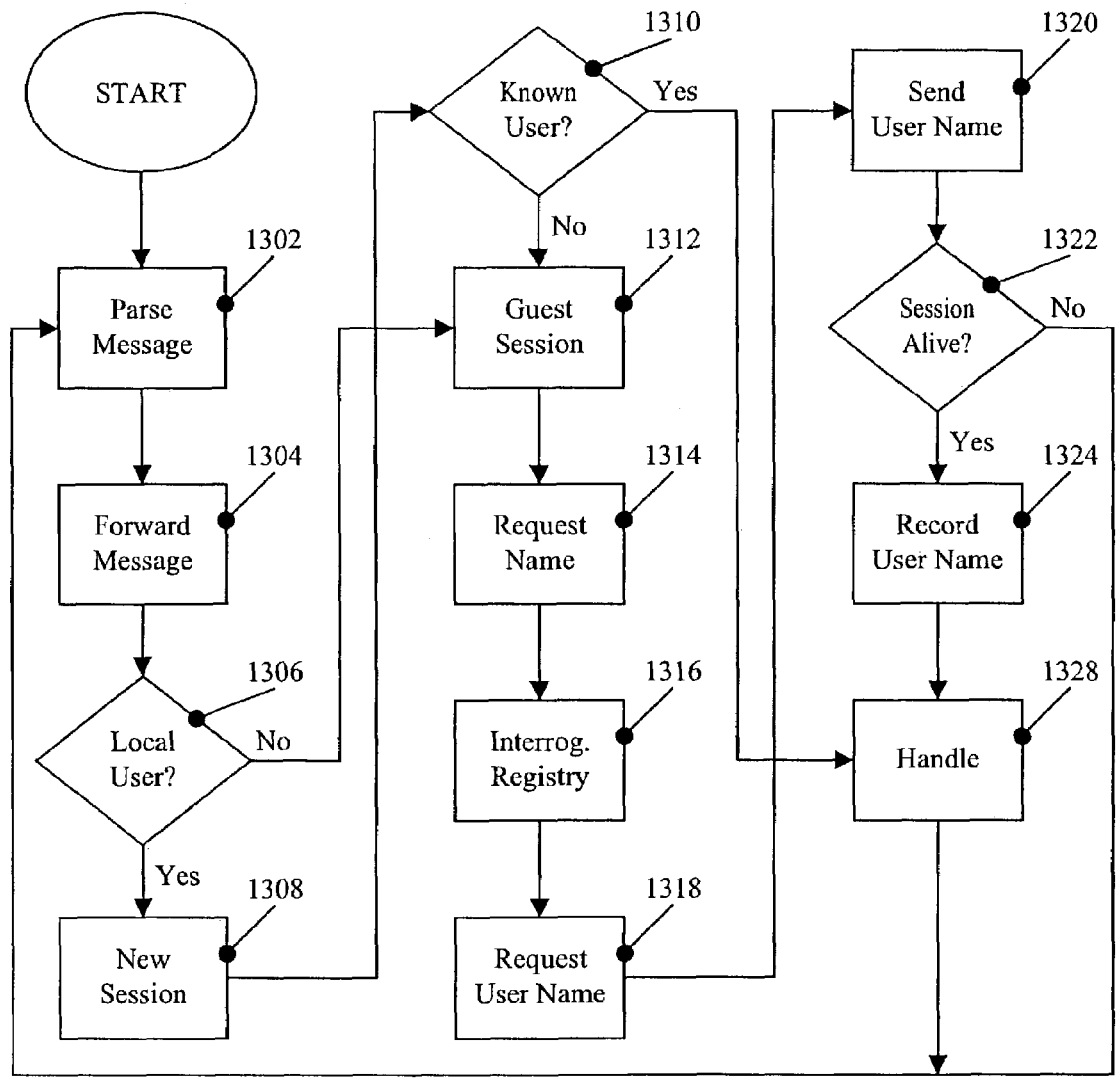
FIG. 13 shows a process flow diagram of a method including associating screen names with users of protocols of interest.

FIG. 13 is a flow chart illustrating an example method for associating screen names with unique user names in accordance with the systems and methods described herein. First, in step 1302, protocol message gateway 122 parse a received message and determine an associated message protocol. Then in step 1309, protocol message gateway 122 can forward the message to a local server 1250 and, in step 1306, can determine whether the user sending the message is a local user, i.e., coupled to enterprise network 130. If the sending user is a local user, then, in step 1308, local server 1250 can be configured to generate a session event 1244 in response to the message. If the user in not a local user, then the process can jump to step 1312.

In step 1310, local server 1250 within protocol message gateway 122 can determine if the user sending the message is known to local server 1250, i.e. is the user name associated with a screen name in the user database 1252 maintained by local server 1250? If the user sending a message is known to local server 1250, then nothing needs to be done and the message can be handled accordingly in step 1328. If the user sending the message is not known to local server 1250, then, in step 1312, local server 1250 can be configured to create a guest session, i.e., a new session with a new user initiating the session. Then, in step 1314, local server 1250 can be configured to send a message to authorization server 128, requesting authorization server 128 obtain a unique user name for the user. Again, in one embodiment the message from server 1250 to authorization server 128 can include an IP address associated with the sender of the message.

In step 1316, authorization server 128 can identify a client device 170 associated, e.g., with the IP address sent received from local server 1250, and can interrogate a registry at that client device 170 to determine a global user ID (GUID) for the client device 170. Because authorization server 128 can directly interrogates the registry at the client device 170, the local server 1290 can obtain information uniquely identifying users without any requirement for cooperation by those users, and without any requirement for cooperation of client devices under control of those users. In cases where an individual user using an IM protocol, for example, has a plurality of screen names, local server 1250 can still associate all of those screen names with the unique user.

Next, in step 1319, authorization server 128 can request, from a domain controller 132, a unique user name associated with the GUID obtained above. Domain controller 132 can be configured to respond by sending the unique user name.

Authorization server 128 can be configured to then send the unique user name to local server 1250 in step 1320.

In step 1322, local server 1250 can be configured to check the to determine if the session associated with the message is still in progress. If the session is not still in progress, e.g., the session was dropped by the sender of the message, then the process can conclude. If the session is still in progress, then, in step 1324, local server 1250 can record the unique user name, and its association with the screen name, in user database 1252.

Protocol message gateway 122 can be adapted to aggregate its treatment of messages with actual users, regardless of the screen names those actual users select for their communications. Thus, if an individual user has two separate screen names, the protocol message gateway 122 can still enforce policy rules with regard to the actual user, notwithstanding that user's separation of his messages into messages comprising two separate screen names. For example, if a particular policy rule restricts users from sending or receiving more than 100 IM messages each hour, protocol message gateway 122 can still restrict an individual actual user, operating under any one or more screen names, from sending or receiving more than 100 IM messages each hour for all screen names combined.

The screen name association information stored in user database 1252 can also be used to identify when a message generated by a user within enterprise network 110 is intended for destination that is also within enterprise network 110. For example, one user 172 within enterprise network 110 can send an IM message to another user 172 within enterprise network 110. In a conventional system, the IM message sent from the first user would have to pass out of network 110 through external network 130 to a remote server configured to determine the destination of the IM message. The remote server would then forward that message, in this case, back to the second user within enterprise network 110. A protocol message gateway 122 configured in accordance with the systems and methods described herein, however, can recognize, using a screen name associated with the destination, that the second user is within enterprise network 110 and simply reflect the message to the second user as opposed to allowing it to exit enterprise network 110 and reach the remote server.

Thus, when protocol message gateway 122 receives a new message it can not only determine if a screen name associated with the source of the message has been associated with a unique user name in user database 1252. But it can also be configured to determine if a screen name associated with the destination of the message has been associated with a unique user name in user database 1252. If the user name associated with the source of the message has been associated with the unique user name in user database 1252, then the policy enforcement rules of that message can be implemented as described above. If the screen name associated with the source of the message has not been associated with a unique user name, then the process described above for associating a unique user name with a screen name can be implemented to generate such an association, which can then be stored in user database 1252.

Similarly, if the session name associated with the destination of the message has been associated with a unique user name and user database 1252, then protocol message gateway 122 can be configured to simply reflect the message to a client device 170 associated with the unique user name. In this way, protocol message gateway 122 can prevent the message from traversing out of enterprise network 110, external network 130, to a remote server, and back. Not only can this speed communications between users 172 within enterprise network 110, but it can also avoid any of the problems associated with communicating outside of enterprise network 110.

If a screen name associated with the destination is not associated with a unique user name in user name database 1252, then a similar process for associating a screen name with a unique user name can be implemented; however, in this case authorization server 128 may not be able to make the association, because the destination can still be outside of enterprise network 110. If such is the case, then the message is not reflected and whatever policy enforcement rules are in place for the message can be implemented.

It should be noted that the systems and methods described herein can apply across a plurality of gateways interfaced via external network 130, for example. In other words, an enterprise can implement multiple protocol message gateways, with each gateway 122 having information related to the other gateways 122 and client devices 170 associated. Thus, the association information stored in user database 1252 can, in certain embodiments, comprise information related to users associated with another protocol message gateway 122. In this case, when a first protocol message gateway 122 determines that a screen name or destination associated with the received message is associated with a unique user name that is in turn associated with a related protocol message gateway 122, the first protocol message gateway 122 can be configured to simply forward the message directly to the destination, e.g., though external network 130 and the related protocol message gateway 122, but still bypassing the remote server.

In another embodiment of the systems and methods described herein, protocol message gateway 122 can be configured to construct a privacy tunnel between a local client device 170 and a remote client device. The process of devising a privacy tunnel is somewhat similar to the process of reflecting a message when multiple protocol message gateways are involved; however, in this case, the remote client device is not necessarily associated with a protocol message gateway that is in turn associated with protocol message gateway 122. Protocol message gateway 122 does however need to know information related to the remote client device and/or a protocol message gateway associated therewith. When a local client device 170 generates a message intended for the remote client device, protocol message gateway 122 can be configured to set up a direct communication link with the remote client device and/or its associated protocol message gateway. In other words, a remote, or local, server can be bypassed when protocol message gateway 122 recognizes that the message generated by local client device 170 is intended for a remote client device about which it possesses direct connection information. Moreover, the communication link between the local client device 170 and the remote client device can be made secure even when communication via a remote server would not be.

Figure 14:
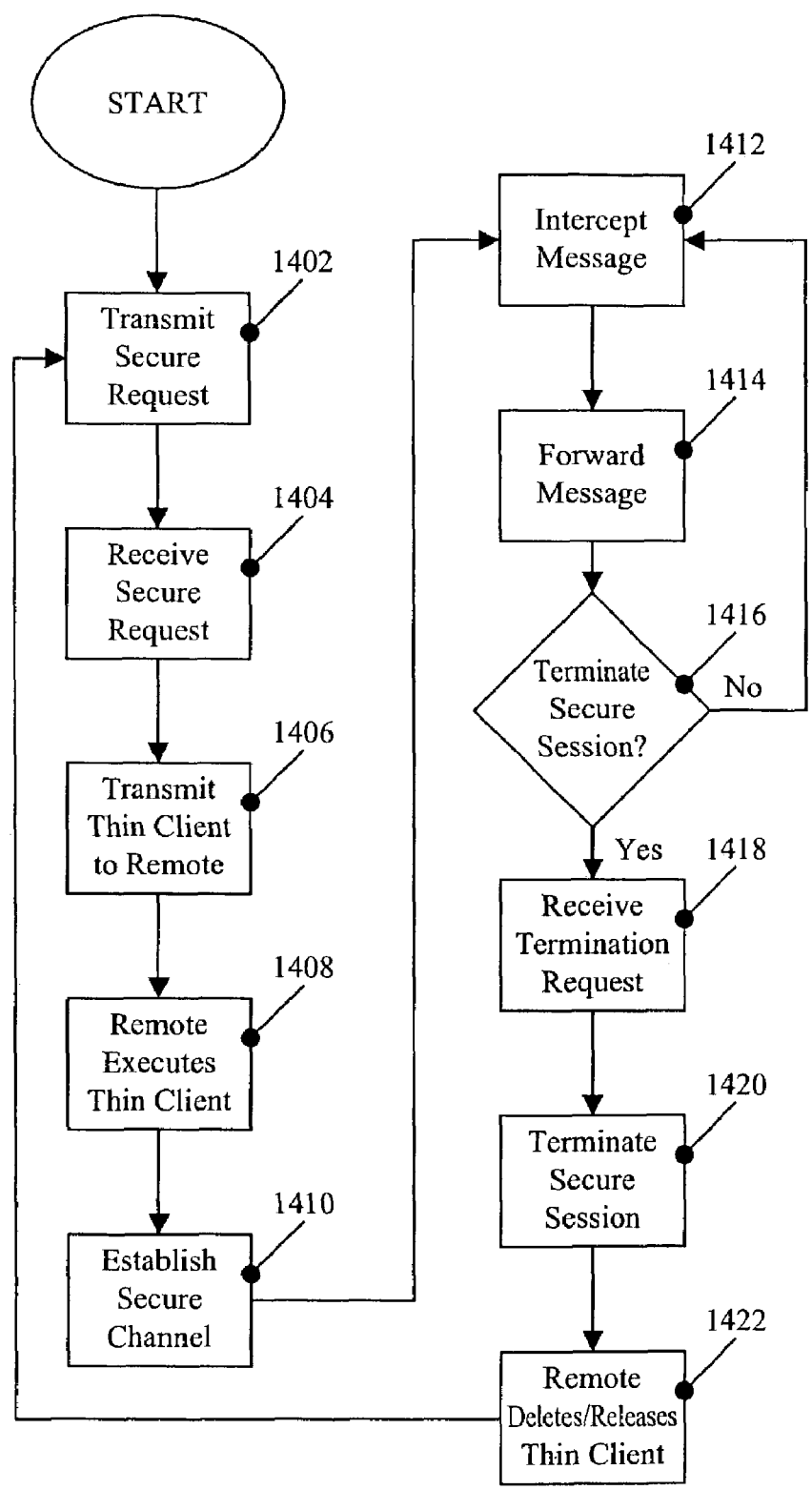
FIG. 14 shows a process flow diagram of a method for communicating using a privacy tunnel.

A flow chart illustrating an exemplary embodiment for generating a privacy tunnel in accordance with the systems and methods described herein is illustrated in FIG. 14. First, in step 1402, a local user, or a remote user, can invoke a secure communications session by submitting a signal to protocol message gateway 122. In one implementation, the user invokes a secure session by transmitting a specified string such as "<SECURE>". Protocol message gateway 122 observes the request, in step 1404, and invokes a secure communications channel by downloading a secure thin client to the remote client device in step 1406. The remote client device can then invoke, in step 1408, the thin client. Protocol message gateway 122 can then establish a secure communications channel through the external network 130 in step 1410.

When protocol client device sends a message to the remote client device, protocol message gateway 122 can intercept the message, in step 1413, and forward it to the thin client running on the remote client device in step 1414.

When either user desires to terminate the secure communication, their client device can send a signal indicated to protocol message gateway 122 in step 1416. In one embodiment, the termination of the secure such session is specified using a string such as "<ENDSECURE>". Protocol message gateway 122 received the request in step 1410 and terminates the secure communications channel. Upon terminate, the thin client terminates its execution and the remote client device releases all resources used by the thin client in step 1420. The remote client device can then can delete the thin client device in step 1422.

In certain embodiments, protocol message gateway 122 can intercept messages from a local client and translate then from one message protocol to another before sending them to the remote client device. This is useful, for example, where the remote client device and local client device are using different message protocols.

Figure 15:
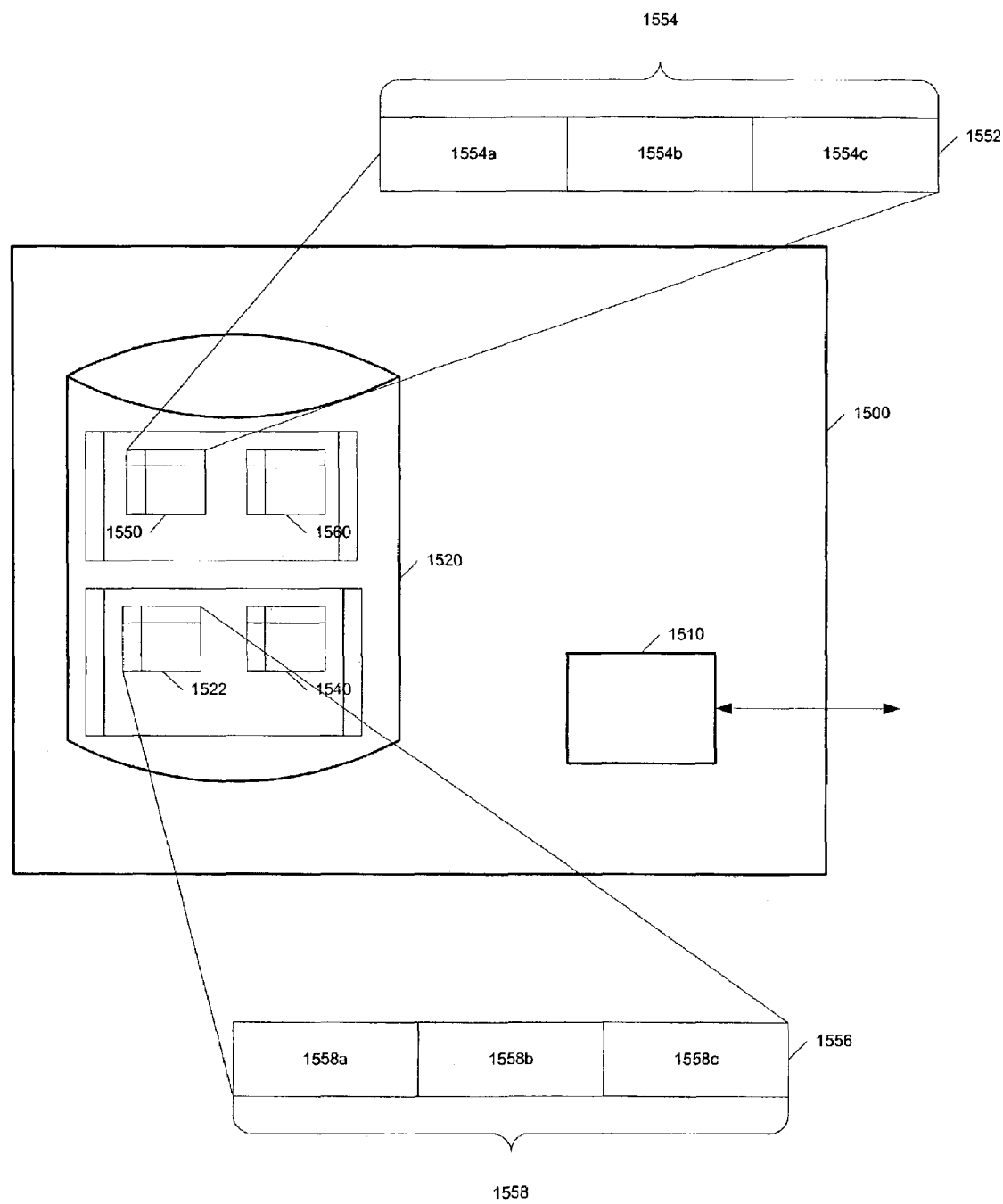
FIG. 15 shows a block diagram illustrating a message protocol gateway configured to detect user presence.

FIG. 15 is a diagram illustrating a message protocol gateway 1500 configured to detect and report when users log on to an application within, e.g., network 110. In the example of FIG. 15, protocol message gateway 1500 can comprise a message protocol element 1510 and a usage database 1520. Message protocol element 1510 can be configured to send and receive messages to and from client devices 170, e.g., using enterprise network 110, or to and from external client devices, e.g., using enterprise network 110 and external network 130. Messages sent or received by message protocol element 1510 can implement various target protocols, such as those described above.

Usage database 1520 can include a set of database tables, including a user table 1550 and an inverted user table 1560. Although usage database 1520 is described herein with regard to detecting and reporting user presence it will be apparent that usage database 1520 is capable of very general extension to detecting and reporting the presence or absence of other resources, and of detecting and reporting other types of events. Usage database 1520 also includes a set of database codes, including a set of SQL instructions 1522 and a set of SQL extensions 1540. It will be understood, of course, that although usage database 1520 is described herein with regard to SQL as an individual instance of a database manipulation and querying language, usage database 1520 can also be configured for other types of database manipulation and querying, and to other types of databases or data sources in general.

In one embodiment, user table 1550 includes a set of entries 1552, sometimes referred to as "rows", each of which includes information for a selected user 172. In such embodiments, user table 1550 includes a set of fields 1554, sometimes referred to as "columns" for each entry 1552, each of which includes a selected data item, or list of data items, for the user associated with that entry 1552. For example, user table 1550 can include a first field 1554*a* that can comprise a user name associated with a selected user, a second field 1554*b* that can comprise a contact list associated with the selected user, and a third field 1554*c* that can comprise an online/offline status associated with the selected user.

Field 1554*b* can, depending on the embodiment, comprise a multidimensional column, i.e., the value associated with field 1554 can itself be a list. SQL extensions 1540 include functions capable of generating a list, e.g., of multiple rows from a multidimensional column 1554, and functions capable of generating a multidimensional column 1554 from a list. This has the effect that a database query otherwise involving linking multiple database tables is capable of being performed using operations on a single database table. For example, without using multidimensional columns, associating a contact list with a selected user might involve a separate linking table, indicating for each pair of users, e.g., user A and user B, whether user B is on user A's contact list. Thus, conducting a contact list query would involve at least one search of the linking table and at least two searches of the user table. By using multidimensional columns, however, associating a contact list with a selected user involves only a single search of the user table itself and the use of a SQL extensions 1540 to generate a list from the multidimensional column used for the contact list.

In one embodiment, inverted user table 1560, similar to user table 1550, includes a set of entries 1556, each of which includes information for a selected user 172. Inverted user table 1560, similar to the user table 1550, can include a set of fields 1558 for each entry 1556, each of which includes a selected data item, or list of data items, for the user associated with that entry 1556. In one embodiment, inverted user table 1560 includes a first field 1558*a* including a user name associated with a selected user, and a second field 1558*b* including an inverted contact list associated with the selected user. The inverted contact list associated with that selected user in this case can be used to indicate those other users who have listed the selected user on their contact lists. Accordingly, when a newly logged-in user is detected, it is relatively easy to search for the set of other users who wish to be informed of the presence of that newly logged-in user.

In one embodiment, SQL extensions 1540 can also include functions capable of specifying a set of database queries expected to be performed frequently, and for which it is desirable to construct an inverted table in response to the original table, similar to the relationship between inverted user table 1560 and user table 1550. In such embodiments, SQL extensions 1540 can, for example, include one or more of the following functions: a function allowing a designer to specify if an inverted table should be automatically constructed in response to an original table, similar to the relationship between inverted user table 1560 and user table 1550, and if so, how fields 1558 of the inverted table relate to any corresponding fields 1554 of the original table; a function allowing a designer to specify if a query relating to the original table should be translated into a query to be performed relating to the inverted table, and if so, how fields 1558 of the inverted table should be tested in correspondence to any testing of fields 1554 of the original table; a function allowing a designer to specify if a query, relating to either an original table or an inverted table, should have its results cashed for later use, and if so, upon what triggers should that query and/or later use be performed.

For example, a query relating to which users on contact lists are logged-in might be performed in response to one or more of the following triggers: (1) when a user logs in, (2) when a user logs out, (3) after a selected period of time expires, (4) after protocol message gateway 1500 is rebooted or reset, and (5) after a selected number of messages have been processed.

SQL extensions 1540 can also include a function allowing a designer to specify if a query, relating to either an original table or an inverted table, should be performed and its results calculated before any actual requests therefore, and if so, upon what triggers should that query be performed.

SQL extensions 1540 can also include a function allowing a designer to specify whether a table should include a multidimensional column, and if so, how that multidimensional column should be treated in response to query results. For example, a query relating to which users on contact lists are logged-in might include a multidimensional column relating to the contact list for each user, and upon performance of a query, results from that multidimensional column might be aggregated and then separated into individual row responses for specific users that are one the content list of the queried user.

Thus protocol message gateway 1500 can be configured to allow efficient, time saving detection of user's present on network 110 and logged on to an application also being used by the user. This can save processing and other resources within network 110. This functionality can be extended by allowing, e.g., a network administrator, to define multidimensional columns, and multidimensional column associations, for other types of databases and database searches.

Figure 16:
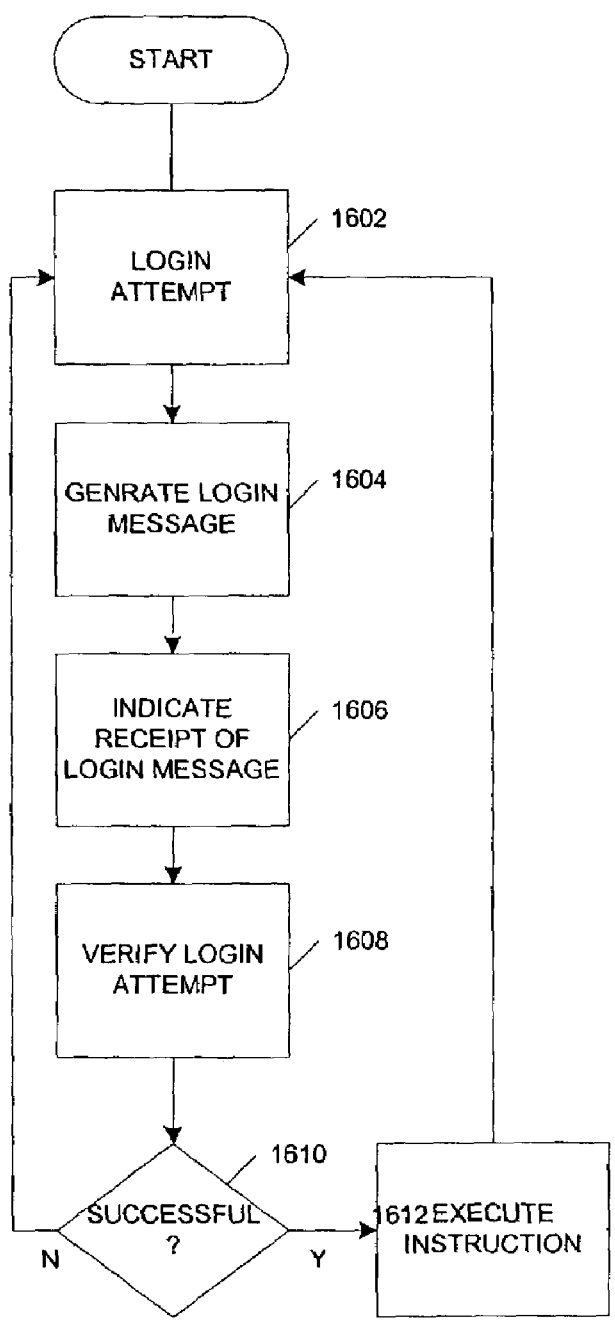
FIG. 16 shows a process flow diagram of a method for detecting user preference.

FIG. 16 is a flow chart illustrating an example method for detection and reporting of user presence in accordance with one embodiment of the systems and methods described herein. First, in step 1602, an internal user 172 at a client device 170, or an external user at an external client device, attempts to login to use an application. In step 1604, an associated client device 170 can be configured to send a message to protocol message gateway 122 indicating the attempt to login, and including information required to login, e.g., a user name or screen name. In step 1606, protocol message gateway 122 can receive the message indicating the attempt to login, and can, for example, respond to client device 170 indicating receipt thereof. In step 1608, if protocol message gateway 122 has sufficient information to verify the login attempt, or to deny the login attempt, then it can be configured to respond to client device 170 so indicating.

For example, protocol message gateway 122 can be configured to have available cached information from an external server indicating which internal users 172 and which external users are presently authorized to login to use the application. In such an embodiment, use of the application can be associated with access to the external server. Thus, the login can actually be an attempt to login to a server, e.g., the external server, associated with the application.

In another implementation, protocol message gateway 122 can be configured to have available a known procedure by which it can determine if the login message is valid, such as for example by reference to a public-key cryptosystem or other trusted server.

In step 1610, if the login is successful, then the process can continue to step 1612. If, however, the login is not successful, then protocol message gateway 122 can deny the attempt and wait for another message (step 1602). In step 1612, protocol message gateway 122 can be configured to perform any SQL instructions 1520 associated with the login. SQL instructions 1520 can, for example, call upon a set of SQL extensions 1540, such as, for example, when using multiple dimensional columns.

In one embodiment, a SQL instructions 1520 associated with the login message can include detecting if any other user, whether an internal user 172 or an external user, on the contact list for the newly logged-in user, is also logged in. For example, SQL instructions 1520 can include a query to be performed against a user table 1550, searching for the contact list associated with the newly logged-in user, and determining if any users on that contact list are already logged in. Thus, the newly logged-in user can be informed of any associated users already logged in.

In another embodiment, SQL instructions 1520 associated with the login can also include detecting if the newly logged-in user is on any contact list for any users already logged in. Thus, users already logged in can be informed of the presence of the newly logged-in user, if that newly logged-in user were on any contact lists for any users already logged in.

Accordingly, performing SQL instructions 1520, in step 1612, can direct usage database 1520 to search an inverted user table 1560 for a newly logged-in user. In one embodiment, SQL instructions 1520 associated with the login calls upon a set of SQL extensions 1540 to search an inverted user table 1560 for the newly logged-in user. For example, in one embodiment, the set of users listing the newly logged-in user on their contact lists can be specified by the SQL extensions 1540 to include a multidimensional column, with the effect that performing the search provides a list of such users. In this example, a multidimensional column can be specified by SQL extensions 1540 to be expanded out to a set of rows, each indicating a single user listing the newly logged-in user on their contact list. Thus, SQL instructions 1520, or some other instruction, can be employed to so inform each of those users of the user presence of the newly logged-in user. Protocol message gateway 122 can be configured to then inform each of the set of users listing the newly logged-in user on their contact lists of the user's presence.

It should be apparent that similar steps might be performed by protocol message gateway 122 in response to other actions having an effect on status of user presence including, for examples, when a new user is registered with protocol message gateway 122, when a user of a selected type, such as a system administrator or chat room facilitator changes the status of their user presence, or when a user logs out.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method for managing communication traffic in a network, comprising:

intercepting a message intended for an external sewer configured to redirect the message to an intended destination;

determining a screen name associated with the destination from the message;

determining if the destination screen name is associated with a unique user name used by the network;

attempting to associate the destination screen name with a unique user name used by the network, when it is determined that the destination screen name is not already associated with a unique user name; and when it is determined that the destination is within the network, redirecting the message to the destination bypassing the external server.

2. The method of claim 1, wherein the received message comprises a screen name, and wherein the method further comprises determining a unique user name for the source, associating the screen name with the unique user name, and storing the association between the screen name and the unique user name.

3. The method of claim 2, further comprising selecting a policy rule for handling the received message based on the unique user name and applying the policy rule to the message.

4. The method of claim 3, wherein the policy rule is based on the source of the received message.

5. The method of claim 3, wherein the policy rule is based on the intended destination of the received message.

6. The method of claim 3, wherein the policy rule is based on information included in the received message.

7. The method of claim 3, where in the policy rule is based on when the received message is sent or intended to be received.

8. The method of claim 3, wherein the policy rule is based on the size of the received message.

9. The method of claim 3, wherein the policy rule is based on whether the received message includes an attachment.

10. The method of claim 3, wherein the policy rule is based on whether the received message includes a virus.

11. The method of claim 3, further comprising determining if a session associated with the received message is still in progress before applying the policy rule.

12. The method of claim 1, further comprising recording information associated with the received message.

13. The method of claim 1, further comprising creating a log comprising information associated with the received message and any related messages.

14. The method of claim 2, wherein the received message is associated with a network address, and wherein determining a unique user name comprises identifying the source using the network address.

15. The method of claim 14, wherein determining a unique user name further comprises determining a global user identification associated with the source.

16. The method of claim 15, determining a global user identification comprises interrogating a registry associated with the source.

17. The method of claim 2, further comprising determining if the screen name has previously been associated with a unique user name, and if so, then applying a policy rule to the message based on the unique user name.

18. The method of claim 1, wherein attempting to associate the destination screen name with a unique user name, comprises:

determining a unique user name for the destination;
   associating the destination screen name with the unique destination user name; and
   storing the association between the destination screen name and the unique destination user name.

19. The method of claim 18, further comprising selecting a policy rule for handling the received message based on the unique destination user name and applying the policy rule to the message.

* * * * *

UNITED STATES PATENT AND TRADEMARK OFFICE
CERTIFICATE OF CORRECTION

PATENT NO. : 7,428,590 B2 Page 1 of 1
APPLICATION NO. : 10/459725
DATED : September 23, 2008
INVENTOR(S) : Randy Miller et al.

It is certified that error appears in the above-identified patent and that said Letters Patent is hereby corrected as shown below:

At column 20, line 30, in Claim 1, change "sewer" to --server--.
At column 20, line 59, in Claim 7, change "where in" to --wherein--.

Signed and Sealed this

Sixth Day of October, 2009

David J. Kappos
*Director of the United States Patent and Trademark Office*